US010087729B2

(12) United States Patent
Slim

(10) Patent No.: US 10,087,729 B2
(45) Date of Patent: Oct. 2, 2018

(54) METHODS UTILIZING SOLUTAL-CONVECTION REGIMES IN A POROUS MEDIUM

(71) Applicant: SCHLUMBERGER TECHNOLOGY CORPORATION, Sugar Land, TX (US)

(72) Inventor: Anja Slim, Cambridge, MA (US)

(73) Assignee: SCHLUMBERGER TECHNOLOGY CORPORATIO, Sugar Land, TX (US)

( * ) Notice: Subject to any disclaimer, the term of this patent is extended or adjusted under 35 U.S.C. 154(b) by 841 days.

(21) Appl. No.: 14/316,181

(22) Filed: Jun. 26, 2014

(65) Prior Publication Data
US 2015/0006131 A1    Jan. 1, 2015

Related U.S. Application Data

(60) Provisional application No. 61/840,973, filed on Jun. 28, 2013.

(51) Int. Cl.
*G06G 7/48* (2006.01)
*E21B 43/16* (2006.01)
*E21B 41/00* (2006.01)

(52) U.S. Cl.
CPC ........ *E21B 43/168* (2013.01); *E21B 41/0064* (2013.01); *Y02C 10/14* (2013.01)

(58) Field of Classification Search
CPC .................................................... E21B 43/168
USPC ......................................................... 703/10
See application file for complete search history.

(56) References Cited

U.S. PATENT DOCUMENTS

| 6,018,497 A | 1/2000 | Gunasekera |
| 6,078,869 A | 6/2000 | Gunasekera |
| 6,106,561 A | 8/2000 | Farmer |

OTHER PUBLICATIONS

Bryant et al.: Flow and solute transport around injection wells through a single, growing fracture; Advances in Water Resources 26 (2003) 803-813.*
Frippiat et al.: A comparative review of upscaling methods for solute transport in heterogeneous porous media; Journal of Hydrology (2008) 362, 150-176.*
Chrysikopoulos et al.: One-Dimensional Solute Transport in Porous Media with Partial Well-to-Well Recirculation: Application to Field Experiments.*
Backhaus, et al., "Convective Instability and Mass Transport of Diffusion Layers in a Hele-Shaw Geometry", Physical Review Letters, vol. 106, Mar. 7, 2011, 4 pages.
(Continued)

*Primary Examiner* — Hugh Jones

(57) ABSTRACT

Methods of analyzing fluid flow in a formation include defining physical boundaries of a porous geological formation reservoir and parameters related to a process of injection of fluid over a period of time, and configuring a reservoir simulator that characterizes transport of the fluid as solute within the physical boundaries of the reservoir in accordance with the fluid injection process. The reservoir simulator utilizes at least one upscaled equation describing advective transport for the solute. Output of the simulator may be viewed. The parameters related to the injection process including one or more of an injection rate, a location of injection, and a time length of injection can be optimized.

15 Claims, 14 Drawing Sheets

(56) References Cited

OTHER PUBLICATIONS

Busse, et al., "Bounds for heat transport in a porous layer", Journal of Fluid Mechanics, vol. 54, Part 3, Sep. 20, 1971, pp. 521-543.
Carpenter, et al., "The Stability of Numerical Boundary Treatments for Compact High-Order Finite-Difference Schemes", Journal of Computational Physics, vol. 108, Issue 2, Oct. 1993, pp. 272-295.
Cheng, et al., "Effect of permeability anisotropy on buoyancy-driven flow for CO2 sequestration in saline aquifers", Water Resources Research, vol. 48, Issue 9, Sep. 2012, p. W09539.
Doering, et al., "Bounds on convective heat transport in a porous layer", Journal of Fluid Mechanics, vol. 376, 1998, pp. 263-296.
Elder, "The unstable thermal interface", Journal of Fluid Mechanics, vol. 32, Issue 1, Apr. 1968, 30 pages.
Elenius, et al., "Effects of a capillary transition zone on the stability of a diffusive boundary layer", IMA Journal of Applied Mathematics, vol. 77, No. 6, 2012, pp. 771-787.
Elenius, et al., "On the time scales of nonlinear instability in miscible displacement porous media flow", Computational Geosciences, vol. 16, Issue 4, Sep. 2012, pp. 901-911.
Ennis-King, et al., "Onset of convection in anisotropic porous media subject to a rapid change in boundary conditions", Physics of Fluids, vol. 17, 2005, p. 084107.
Ennis-King, et al., "Role of Convective Mixing in the Long-Term Storage of Carbon Dioxide in Deep Saline Formations", SPE-84344-MS, Society of Petroleum Engineers, SPE Annual Technical Conference and Exhibition, Denver, Colorado, SPE Journal, vol. 10, No. 3, Oct. 5-8, 2003, pp. 349-356.
Fornberg, "Generation of finite difference formulas on arbitrarily spaced grids—See more at: http://www.ams.org/journals/mcom/1988-51-184/S0025-5718-1988-0935077-0/#sthash.11BGyC61.dpuf", Mathematics of Computation, vol. 51, Oct. 1988, pp. 699-706.
Gasda, et al., "Vertically averaged approaches for CO2 migration with solubility trapping", Water Resources Research, vol. 47, Issue 5, May 2011, p. W05528.
Graham, et al., "Plume formation and resonant bifurcations in porous-media convection", Journal of Fluid Mechanics, vol. 272, Aug. 1994, pp. 67-90.
Hanjalic, "One-Point Closure Models for Buoyancy-Driven Turbulent Flows", Annual Review of Fluid Mechanics, vol. 34, Jan. 2002, pp. 321-347.
Hassanzadeh, et al., "Scaling behavior of convective mixing, with application to geological storage of CO2", AIChE Journal, vol. 53, Issue 5, May 2007, 11 pages.
Hewitt, et al., "Convective shutdown in a porous medium at high Rayleigh number", Journal of Fluid Mechanics, vol. 71, Mar. 2013, pp. 551-586.
Hewitt, et al., "Ultimate Regime of High Rayleigh Number Convection in a Porous Medium", Physical Review Letters, vol. 108, May 30, 2012, p. 224503.
Hidalgo, et al., "Scaling of Convective Mixing in Porous Media", Physical Review Letters, vol. 109, Dec. 27, 2012, 5 pages.
Horton, et al., "Convection Currents in a Porous Medium", Journal of Applied Physics, vol. 16, 1945, pp. 367-370.
Howard, "Convection at high Rayleigh number", Applied Mechanics, Proc. 11th Congress of Applied Mathematics, 1966, pp. 1109-1115.
Kim, et al., "Linear stability analysis on the onset of buoyancy-driven convection in liquid-saturated porous medium", Physics of Fluids, vol. 24, 2012, p. 044102.

Kneafsey, et al., "Laboratory experiments and numerical simulation studies of convectively enhanced carbon dioxide dissolution", 10th International Conference on Greenhouse Gas Control Technologies, Energy Procedia, vol. 4, 2011, pp. 5114-5121.
Lapwood, "Convection of a fluid in a porous medium", Mathematical Proceedings of the Cambridge Philosophical Society, vol. 44, Issue 4, Oct. 1948, pp. 508-521.
Lindeberg, et al., "Vertical convection in an aquifer column under a gas cap of CO2", Energy Conversion and Management, vol. 38, Proceedings of the Third International Conference on Carbon Dioxide Removal, 1997, pp. S229-S234.
Macminn, et al., "CO2 migration in saline aquifers. Part 2. Capillary and solubility trapping", Journal of Fluid Mechanics, vol. 688, 2011, pp. 321-351.
Macminn, et al., "Spreading and convective dissolution of carbon dioxide in vertically confined, horizontal aquifers", Water Resources Research, vol. 48, Issue 11, Nov. 2012, 12 pages.
Baines, et al., "Turbulent Buoyant Convection from a Source in a Confined Region", J. Fluid Mech. 37, 1969, pp. 51-80.
Neufeld, et al., "Convective dissolution of carbon dioxide in saline aquifers", Geophysical Research Letters, vol. 37, Issue 22, Nov. 2010, 5 pages.
Otero, et al., "High-rayleigh-number convection in a fluid-saturated porous layer", Journal of Fluid Mechanics, vol. 500, No. 1, 2004, pp. 263-281.
Pau, et al., "High-resolution simulation and characterization of density-driven flow in CO2 storage in saline aquifers", Advances in Water Resources, vol. 33, Issue 4, Apr. 2010, pp. 443-455.
Rapaka, et al., "Non-modal growth of perturbations in density-driven convection in porous media", Journal of Fluid Mechanics, vol. 609, Aug. 2008, pp. 285-303.
Riaz, et al., "Onset of convection in a gravitationally unstable diffusive boundary layer in porous media", Journal of Mechanics, vol. 548, Feb. 2006, pp. 87-111.
Slim, et al., "Dissolution-driven convection in a Hele—Shaw cell", Physics of Fluids, vol. 25, 2013, 21 pages.
Slim, et al., "Onset and cessation of time-dependent, dissolution-driven convection in porous media", Physics of Fluids, vol. 22, 2010, p. 124103.
Weir, et al., "Reservoir storage and containment of greenhouse gases", Energy Conversion and Management, vol. 36, Issues 6-9, Proceedings of the Second International Conference on Carbon Dioxide Removal, Jun.-Sep. 1995, pp. 531-534.
Wooding, "Convection in a saturated porous medium at large Rayleigh number or Peclet number", Journal of Fluid Mechanics, vol. 15, No. 4, Mar. 1963, pp. 527-544.
Xie, et al., "Speed of free convective fingering in porous media", Water Resources Researchvol. 47, Issue 11, Nov. 2011, p. W11501.
Barenblatt, et al., "Scaling, Self-similarity, and Intermediate Asymptotics: Dimensional Analysis and Intermediate Asymptotics", Cambridge Texts in Applied Mathematics, Cambridge University Press, 1996, pp. 1-9.
Boyd, "Chebyshev and Fourier Spectrum Methods", Springer Second Revised Edition, Dec. 3, 2001, p. 229.
Canuto, et al., "Spectral Methods: Fundamentals in Single Domains", Springer ISBN 978-3-540-30726-6, 2006, pp. 3-16.
Boyd, "Chebyshev and Fourier Spectrum Methods", Springer Second Revised Edition, Dec. 3, 2001, p. 59.
Canuto, et al., "Spectral Methods: Fundamentals in Single Domains", Springer ISBN 978-3-540-30726-6, 2006, pp. 527-528.

* cited by examiner

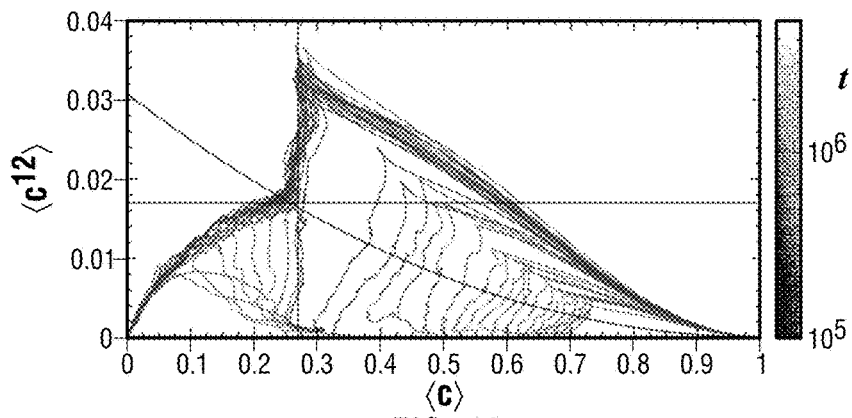
FIG. 12
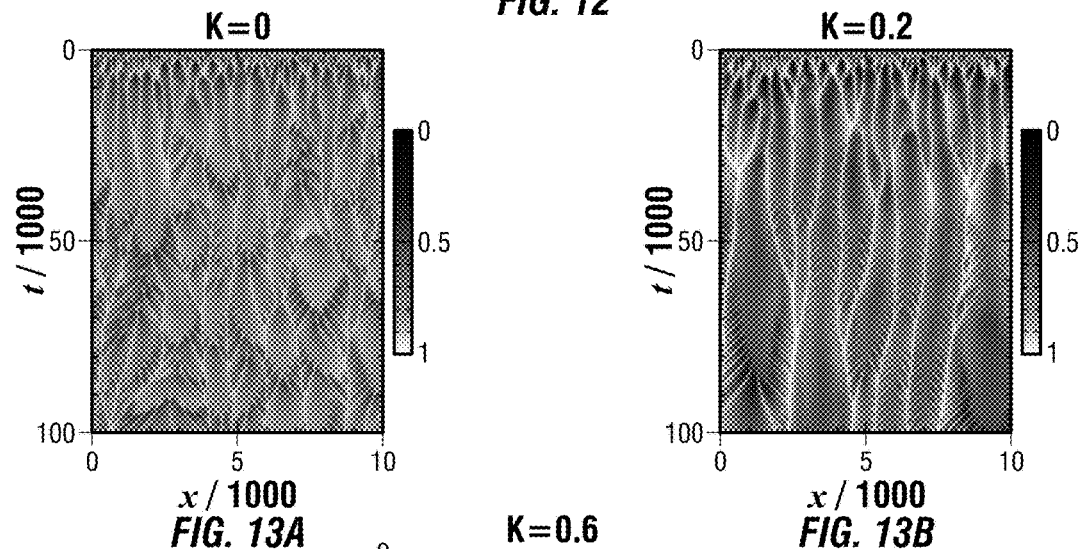
FIG. 13A
FIG. 13B
FIG. 13C

METHODS UTILIZING SOLUTAL-CONVECTION REGIMES IN A POROUS MEDIUM

PRIORITY

The present application claims the benefit of U.S. Application Ser. No. 61/840,973, filed Jun. 28, 2013, which application is incorporated herein, in its entirety, by reference.

TECHNICAL FIELD

The subject disclosure relates to geological formations. The subject disclosure more particularly relates to methods of modeling the flow of fluid in geological formations.

BACKGROUND

One manner of reducing anthropogenic carbon-dioxide ($CO_2$) emissions into the atmosphere is the sequestration of the $CO_2$ in porous, brine-filled formations having cap rocks. The $CO_2$ is introduced into the suitable formation, typically at a depth of between one and three kilometers via a borehole drilled in the formation. There the $CO_2$ is positively buoyant and rises until it encounters a cap rock, beneath which it spreads primarily horizontally. The separate-phase $CO_2$ gradually dissolves into the underlying brine. Initially this occurs by diffusion. However, $CO_2$-enriched brine is denser than pure brine and the layer may eventually become gravitationally unstable and experience convective overturning. Understanding the dissolution process is of practical interest as it can be important in determining various parameters such as the capacity of the formation to receive the $CO_2$, the rate at which the $CO_2$ may be injected into the formation, and the manner in which and locations to which the $CO_2$ spreads over time.

Before undertaking a sequestration project, it is common to attempt to model the project. Geological models are known. For example, ECLIPSE (a trademark of Schlumberger) is an oil and gas reservoir simulator that provides a high resolution geological model with a grid scale of approximately 1 cm for simulating flow and mass transport in highly complex, variably saturated conditions. ECLIPSE, which is described in co-owned U.S. Pat. Nos. 6,018,497, 6,078,869, and 6,106,561 which are hereby incorporated herein in their entireties, can incorporate density effects when modeling brine as well as coupling geomechanical modeling with fluid flow. ECLIPSE can also perform fluid flow predictions. However, neither ECLIPSE, nor other presently available geological models can computationally account for solutal convection over a portion of a formation that may have a horizontal breadth on the order of kilometers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a reservoir simulator is provided that utilizes information regarding a porous portion of a formation into which fluid is to be injected, including boundary conditions, as well as fundamental equations to predict the transport over time of the fluid as solute in a porous medium typically containing brine. In one aspect, the reservoir simulator utilizes upscaled equations describing advective transport for the solute that is suitable for computer computation with respect to a formation breadth on the order of a kilometer or more. In another aspect, the reservoir simulator utilizes a horizontal averaging ("upscaling") of solute transport described by an advection-diffusion equation that represents a conservation law for the solute. In solving the upscaled advection-diffusion equation, the simulator utilizes an equation permitting a determination of advective flux. In one embodiment, the equation permitting a determination of advective flux can be solved by approximating a third moment that approximates individual plumes as portions of sinusoids. In one embodiment, the reservoir simulator utilizes an effective boundary condition that describes the conversion of vertical diffusive transport in the formation by relating the dissolution flux to the solute concentration and the critical Rayleigh number. In one embodiment, the critical Rayleigh number is assumed constant in a "constant flux" regime.

In one embodiment, a reservoir simulator that utilizes upscaled equations describing advective transport for solute that is suitable for computer computation with respect to a formation breadth on the order of a kilometer or more is based on an existing reservoir simulator such as ECLIPSE. Regardless, the reservoir simulator will require a high speed computer capable of intensive and extensive data processing that is not capable of being conducted by humans.

In one embodiment, a method for simulating the movement of carbon dioxide in a formation over time includes providing information regarding the formation to a simulator that utilizes upscaled equations describing advective transport for solute. In one embodiment, the information regarding the formation includes information describing an impermeable saturated upper layer. In another embodiment, the information regarding the formation includes information describing a partially permeable saturated upper layer.

In one embodiment, a simulation of the transport of carbon dioxide in the formation over time provided by a simulator that utilizes upscaled equations describing advective transport for solute is used to assess the suitability of sequestration of carbon dioxide in a formation.

BRIEF DESCRIPTION OF THE DRAWINGS

FIG. 1a is a schematic of a portion of a geological formation with an impermeable lower boundary, a permeable layer designated for receiving injected fluid, and an upper boundary that is either impermeable or partially permeable, while

FIG. 12 is a plot showing the local vertical advective flux versus the horizontally averaged concentration in the constant-flux and shut-down regimes.

FIGS. 13a-13c are plots showing an evolution of the concentration profile at a given depth with three different permeabilities assumed for the upper boundary.

DETAILED DESCRIPTION

Figure 1A:
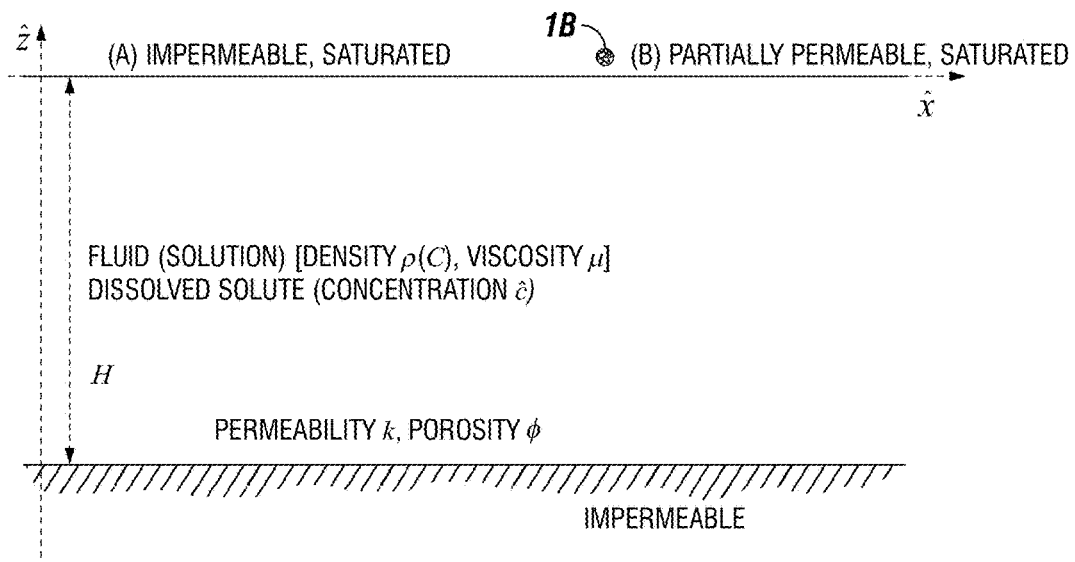

The disclosure has particular application to analyzing the flow of carbon-dioxide injected into a porous, brine-filled formation, although it is not limited thereto.

In one aspect, a numerical study is presented of two-dimensional solutal convection from a noisy initial condition in a simple, idealized geometry. As described hereinafter with reference to FIGS. 1a and 1b, this geometry consists of a horizontal porous layer with an impenetrable lower boundary and a solute-saturated upper boundary that is either impermeable or partially permeable to flow. The latter mimics the scenario that is relevant to $CO_2$ storage where solute only partially occupies the pore space above the actively convecting layer. A full dynamical picture is presented from almost first contact between solute and solvent through to high dissolved solute saturation for Rayleigh numbers R (the dimensionless layer thickness and the only parameter) between 100 (just above the stability boundary) and $5 \times 10^4$ (well into the "chaotic" regime). In one aspect, the dynamical picture involves characterization of key dynamical regimes. In another aspect, the dynamical picture involves a universal dissolution-flux parameterization. In another aspect, the dynamical pictures involves universal and physically substantiated upscaled equations.

Solutal convection differs fundamentally from the thermal convection problem conventionally studied, in which impermeable boundaries have a prescribed temperature, because the transient behavior is of interest rather than the final, statistically steady state. In the thermal case, regime changes occur with increasing Rayleigh number (in this context usually interpreted as the ratio of diffusive to convective time scales across the layer). For $R<4\pi^2$ there is pure conduction (See, Horton, C. W. & Rogers, F. T., "Convection currents in a porous medium", J. Appl. Phys. 16, 367-370 (1945), and Lapwood, E. R., "Convection of a fluid in a porous medium", Proc. Camb. Phil. Soc. 44, 508-521 (1948)), while for $4\pi^2<R\leq500$ there are steady rolls (See, Busse, F. H. & Joseph, D. D., "Bounds for heat transport in a porous layer", J. Fluid Mech. 54, 521-543 (1972), and for $500<R\leq1300$ there are perturbed rolls (See, Graham, M. D. & Steen, P. H., "Plume formation and resonant bifurcations in porous-media convection", J. Fluid Mech. 272 (1), 67-90 (1994)). Finally, for R>1300 there is a chaotic regime with vertical columnar exchange flow in the bulk and horizontal boundary layers at the upper and lower surfaces on which "protoplumes" form (See, Otero, J. et al., "High-Rayleigh-number convection in a fluid-saturated porous layer", J. Fluid Mech. 500 (1), 263-281 (2004), and Hewitt, D. R. et al., "Ultimate regime of high Rayleigh number convection in a porous medium", Phys. Rev. Lett. 108 (22), 224503, (2012)).

In solutal convection, regime changes occur in time rather than with Rayleigh number (See, Slim, A, et al. "Dissolution-driven convection in a Hele-Shaw cell", Phys. Fluids 25, 024101 (2012)). The dynamics are initially localized to the source of solute at the upper boundary and the layer thickness does not play a role until plumes reach the bottom boundary. Thus, most regimes are parameter independent and the Rayleigh number only controls how many of these regimes are encountered before the bottom influences the dynamics and the flow transitions to a final R-dependent regime. For a flow-impermeable upper boundary, there are a number of studies based on simulations and experiments that may be summarized as follows:

Initially there is a "diffusive regime" in which perturbations decay and the solute profile tends to the standard, purely diffusive error function. The dissolution flux decays proportionally to $\hat{t}^{-1/2}$, where $\hat{t}$ is time.

Eventually, sufficient dense fluid accumulates beneath the upper boundary for perturbations to amplify in a "linear-growth regime." Various theoretical estimates exist for when onset occurs.

Once convective fingers are macroscopic, they accelerate downwards with little lateral motion, stripping dense fluid from the interface and sharpening the concentration gradient at the upper boundary. This augments the dissolution flux, causing it to deviate from $\hat{t}^{-1/2}$ decay and grow to a local maximum, in a "flux-growth regime."

Once fingers are sufficiently long, they begin interacting with their neighbours in a "merging regime." Pairs of fingers zip together from the root downwards and stunted fingers retreat. Several generations of such coarsening occur to form complex downwelling plumes.

In the Hele-Shaw cell experimental study of Slim, A, et al. "Dissolution-driven convection in a Hele-Shaw cell", Phys. Fluids 25, 024101 (2012), mergers were observed to eventually cease. However, as a result of the coarsening, the upper horizontal boundary layer between the remaining primary plumes was sufficiently thick to be unstable. New plumes formed, only to be swept back into and be subsumed by the primary plumes. In one embodiment, this is hypothesized to be a separate "reinitiation regime."

Finally, plumes impact the lower boundary and the entire layer progressively saturates with dissolved solute in a R-dependent "shut-down regime." The horizontally averaged concentration field has a vertically well-mixed bulk with a gradually expanding upper horizontal boundary layer. Exploiting this structure, a box-model analysis based on phenomenology is described in Howard, L. N., "Convection at high Rayleigh numbers", *Applied Mechanics, Proc.* 11*th Congress of Applied Mathematics* (ed. H. Görtler), pp. 1109-1115 (1964) which provides a good description of the flux. See, also, Hewitt, D. R. et al., "Convective shutdown in a porous medium at high Rayleigh number", *J. Fluid Mech.* (2013).

An analysis of the studies taken together suggesting the presence of six regimes outlined above raises several issues. First, there is limited data for the final three ("merging", "reinitiation" and "shut-down) regimes. There are no clear transition times between them, and the "reinitiation" regime was not observed as being clearly distinct from the "shut-down" regime. Second, the experiments may have suffered from finite-size effects, especially for the later, post-coarsening regimes. In fact, for larger R, a statistically constant flux regime has been identified in both experiments (See, Neufeld, J. A., et al., "Convective dissolution of carbon dioxide in saline aquifers", *Geophys. Res. Lett.* 37, L22404 (2011), and Backhaus, S. et al., "Convective instability and mass transport of diffusion layers in a Hele-Shaw geometry", *Phys. Rev. Lett.* 106 (10), 104501 (2011)), and simulations (See, Pau, G. S. H., et al., "High-resolution simulation and characterization of density-driven flow in $CO_2$ storage in saline aquifers", *Adv. Water Res.* 33 (4), 443-455 (2010), and Hidalgo, J. J. et al., "Scaling of convective mixing in porous media", *Phys. Rev. Lett.* 109 (26), 264503 (2012)). However, it is not evident that this "constant flux regime" fits into the above classifications and, if it exists, why does it exist given that the system is progressively saturating. There is also disagreement over the value of the flux and whether it is layer-depth, and thus, R-dependent.

In one aspect, simulations are used to validate and expand on the regime picture portrayed above and extend it to significantly higher Rayleigh numbers. In particular, the separate reinitiation regime postulated from the Hele-Shaw experiments is eliminated. Reinitiations begin once the gap between plumes has grown to sufficient size through mergers, a process that is markedly spatially heterogeneous. Once reinitiations occur everywhere, the flux becomes constant and a "constant-flux regime" is introduced after the "merging regime". In one embodiment, a R-independent flux is observed, whose value is in excellent agreement with the value obtained numerically by the previously-referenced Pau, G. S. H. et al., (2010). The flux is maintained at this constant value after plumes hit the lower boundary and until information about the finite vertical extent of the layer reaches the upper boundary. The flow then transitions to a shut-down regime with similar properties to those described above.

In one aspect, a characterization of the "constant-flux regime" is provided, as is an explanation for the behavior. In another aspect, new and more accurate details of all the regimes are provided, and clear, quantitative delineations are shown between the regimes. In another aspect, perturbation- and R-dependent effects are disentangled by presenting simulations for increasing R with identical noisy initial conditions and thus showing R-independence until the plumes hit the lower boundary and perturbation-independence after the merging regime.

In one embodiment, a system of upscaled equations and boundary conditions is provided governing the evolution in the constant-flux and shut-down regimes. These link the horizontally averaged concentration, vertical advective flux and plume widths. In one embodiment, by making certain empirical assumptions, reasonably good quantitative agreement with simulated behavior for both solutal and thermal convection is obtained.

For an embodiment assuming a partially permeable upper boundary, because fluid is exchanged with the overlying layer, there is an additional source of dense fluid and convective modes are less restricted. Thus, onset of instability occurs substantially sooner than for the impermeable upper boundary embodiment (See, Slim, A., & Ramakrishnan, T. S., "Onset and cessation of time-dependent, dissolution-driven convection in porous media", *Phys. Fluids* 22, 124103 (2010)), although the first mode that can become unstable spans the layer thickness and is unlikely to be excited with appreciable amplitude. In the extremal case of an infinitely permeable overlying layer, simulations at R=2000 show the flux to increase approximately fourfold over the impermeable case (See, Eleniu, M. T. et al., "Effects of a capillary transition zone on the stability of a diffusive boundary layer", *IMA J. of Appl. Math* (2012)).

In one aspect, the regime decomposition is extended to the partially permeable case for select relative permeabilities in the overlying layer. In this case, the boundary-layer structure changes markedly from the impermeable case, but significant features of the bulk flow such as the plume widths and flux in the shut-down regime remain almost identical.

In one aspect, it is useful to describe the governing equations, scalings and important global measures for a model. In one embodiment, an impermeable upper boundary system may be considered with details and justifications of assumptions for application to $CO_2$ storage given by Ennis-King, J. & Paterson, L., "Role of convective mixing in the long-term storage of carbon dioxide in deep saline formations", *SPE J.* 10(3), 349-356 (2005) and Slim, A., & Ramakrishnan, T. S., "Onset and cessation of time-dependent, dissolution-driven convection in porous media", *Phys. Fluids* 22, 124103 (2010). In another embodiment, a permeable upper boundary scenario is formulated by the Slim, A., & Ramakrishnan, T. S. (2010) reference.

Figure 1B:
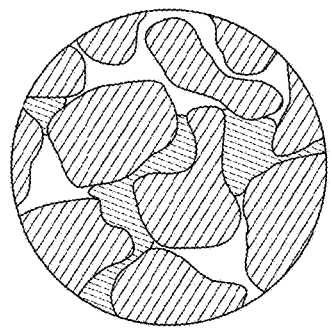
FIG. 1b is an inset showing a pore-level configuration of a partially permeable saturated upper bounder.

Consider a horizontal, two-dimensional, ideal porous layer of permeability k, porosity φ and thickness H as shown in FIGS. 1*a* and 1*b*. It is underlain by an impermeable lower layer. It is overlain by a solute-bearing upper layer in which the solute is instantaneously placed at time $\hat{t}=0$ and which may be impermeable or partially permeable to fluid flow. The convective dissolution process is studied in isolation, and thus it is assumed that there are no changes in the system's geometry, temperature or pressure. The layer is described by Cartesian coordinates ($\hat{x},\hat{z}$), with $\hat{x}$ directed horizontally, $\hat{z}$ directed vertically upwards and $\hat{z}=0$ coinciding with the boundary between the solute-bearing and convecting layers. FIGS. 1*a* and 1*b* show a configuration after solute is instantaneously introduced into the pore space above $\hat{z}=0$. The boundary between the convecting layer $\hat{z}<0$ and the separate-phase-solute bearing overlying layer $\hat{z}>0$ is either (a) impermeable or (b) partially permeable to fluid flow. In the latter case, the inset of FIG. 1*b* sketches a possible pore-level configuration with black regions representing solid grains, grey regions representing separate-phase solute, and white regions representing solute-saturated fluid.

An inertialess, Boussinesq, incompressible Darcy flow is assumed through the medium and is described by $$\hat{u} = -\frac{k}{\mu}(\hat{\nabla}\hat{p} + \rho(\hat{c})ge_z), \quad (1)$$

$$\hat{\nabla} \cdot \hat{u} = 0 \text{ in } -H < \hat{z} < 0,$$

where $\hat{u}=(\hat{u}, \hat{w})$ is the Darcy velocity, $\hat{p}$ pressure, g gravity and $\mu$ fluid viscosity. The density $\rho$ is the only solute-dependent property. It depends linearly on the concentration $\hat{c}$ above the initial average $$\rho = \rho_0 + \Delta\rho \frac{\hat{c}}{c_{sat}}, \quad (2)$$

where $c_{sat}$ is the excess concentration at saturation, $\rho_0$ is the initial average density and $\Delta\rho$ is the maximum excess density.

Solute is redistributed by advection and diffusion according to $$\phi\frac{\partial\hat{c}}{\partial\hat{t}} + \hat{u}\cdot\hat{\nabla}\hat{c} = \phi D\hat{\nabla}^2\hat{c} \text{ in } -H < \hat{z} < 0, \quad (3)$$

where D is the effective diffusivity. The lower boundary is impenetrable to fluid and solute:

$$\hat{w} = 0, \frac{\partial\hat{c}}{\partial\hat{z}} = 0 \text{ on } \hat{z} = -H. \quad (4)$$

The upper boundary is saturated; i.e., $$\hat{c}=c_{sat} \text{ on } \hat{z}=0, \quad (5)$$

and either impermeable or partially permeable to fluid flow. The former case results in $$\hat{w}=0 \text{ on } \hat{z}=0. \quad (6)$$

In the latter case, the overlying layer is taken to be infinitely thick and to have relative permeability K≥0. In one embodiment it is assumed that fluid in the overlying layer is instantaneously saturated $\hat{c}=c_{sat}$ and thus the equations governing flow are $$\hat{u} = -\frac{Kk}{\mu}(\hat{\nabla}\hat{p} + (\rho_0+\Delta\rho)ge_z), \hat{\nabla}\cdot\hat{u} = 0 \text{ in } \hat{z}>0 \quad (7a)$$

with interfacial conditions $[\hat{w}]=0$, $[\hat{p}]=0$ on $\hat{z}=0$, where [•] indicates a jump in the bracketed quantity. The system is taken to be periodic in $\hat{x}$ with period $\hat{W}$.

A natural velocity scale for the flow is the speed with which a fully saturated fluid parcel falls, $U=k\Delta\rho g/\mu$. Natural length scales are the length over which advection and diffusion balance $L=\phi D/U$ and the layer thickness H. By rescaling by L, the role of R becomes clear. In particular, by setting $$\hat{u} = Uu, \hat{p}+\rho_0 g\hat{z} = \frac{\mu UL}{k}p, \hat{c} = c_{sat}c, \hat{x} = Lx, \text{ and } \hat{t} = \frac{\phi L}{U}t \quad (7b)$$

the parameter-free governing equations are generated:

$$u = -\nabla p - ce_z, \nabla\cdot u = 0 \text{ and } \frac{\partial c}{\partial t} + u\cdot\nabla c = \nabla^2 c. \quad (8a, 8b, 8c)$$

Lower boundary conditions are $$w = 0, \frac{\partial c}{\partial z} = 0 \text{ on } z = -R. \quad (9)$$

Thus the Rayleigh number $R=Hkg\Delta\rho/\mu\phi D$, only appears as the location of the lower boundary and is interpreted as the dimensionless layer thickness. The impermeable upper boundary conditions are w=0, c=1 on z=0.

In the permeable upper boundary scenario, the rescaled equations in the overlying layer become $u=-K(\nabla p+e_z)$, $\nabla\cdot u=0$, with interfacial conditions $[\hat{w}]=0$, $[\hat{p}]=0$, c=1 on z=0. Periodic boundary conditions are imposed on x=0 and x=W/L=W. This system is solved numerically using a spectral method for the impermeable case and a compact finite-difference method for the permeable one. The domain width $W=10^5$ is set independent of Rayleigh number. This gives an aspect ratio of two at the highest R considered.

In one embodiment, the system is solved numerically by introducing a streamfunction $\psi$ such that $(u,w)=(-\partial\psi/\partial z, \partial\psi/\partial x)$. Then, equation (8a) is satisfied automatically while $\nabla\times$(8b) reduces to $$\nabla^2\psi = -\frac{\partial c}{\partial x}. \quad (9a)$$

For the impermeable case, a spectral method in space is utilized, decomposing as Fourier modes in x and Chebyshev in z (see Canuto, C., et al., *Spectral methods: fundamentals in single domains*, Springer (2007). Spectral coefficients are used for all linear terms and physical collocation point values for the nonlinear advection term (converting via the discrete Fourier and cosine transforms). Equation (8c) is integrated in time using a third-order Runge-Kutta scheme for the advection term and Crank-Nicolson for the diffusion term (See, Canuto, C. et al., (2007) § D.4). To ensure that the matrix equations arising from equation (9a) and the Crank-Nicolson implementation for equation (8c) are well-conditioned and can be solved efficiently, a recursion relation is used for second derivatives (See, Canuto, C. et al., (2007) § D.4.1.2).

In the permeable case, a compact finite-difference method for solving the system numerically may be utilized. For K=0.6, the vertical resolution and small time-steps needed for accurate results are prohibitively expensive in the spectral scheme. Instead, a Fourier decomposition is used in x and a compact finite-difference scheme in z for the partially permeable scenario. More particularly, first, the interfacial conditions and the governing equations in the overlying layer are reduced to a boundary condition. The governing equations in the upper layer also reduce to equation (9a) on introducing a streamfunction, with the right-hand side becoming zero. Fourier decomposing in x and imposing decay as z→∞, the solution is found to be $$\psi=\psi(z=0,t)e^{-|m|z+imx} \text{ in } z>0 \quad (9b)$$

for wavenumber m. Continuity of pressure across the boundary then implies $$\left.\frac{\partial\psi}{\partial z}\right|_{z=0^-} = \frac{1}{K}\left.\frac{\partial\psi}{\partial z}\right|_{z=0^+} \quad (9c)$$

and hence $$|m|\psi + K\frac{\partial\psi}{\partial z} = 0 \text{ on } z = 0, \quad (9d)$$

for Fourier mode m≠0. For m=0, $\psi$=0 on z=0.

In the convecting layer, a stretched coordinate system in z that focuses grid points near the upper boundary can be used. To approximate equation (9a) and calculate the horizontal velocity u, a compact fourth-order Padé scheme can be used together with consistent third-order boundary conditions. See, Carpenter, M. H., et al., "The stability of numerical boundary treatments for compact high-order finite-difference schemes", *J. Comp. Phys.* 108, 272-295 (1993). To approximate the spatial derivatives in the concentration equation (8c), an explicit sixth-order scheme (Fornberg, B., "Generation of finite difference formulas on arbitrarily spaced grid", *Math. of Computation* 51 (184) 699-706 (1988)) may be used for the diffusive terms and the compact fourth-order scheme for vertical advection. Evolve in time may be obtained using third-order Adams-Bashforth for the advective terms and Crank-Nicolson for the diffusive (See, Boyd, J. P., *Chebyshev and Fourier Spectral Methods*, Springer (2001)).

The numerical scheme should resolve all potentially unstable waves in x. Stability analysis implies a shortest wavelength of about 60 (see previously referenced Slim, A. C. and Ramakrishnan T. S., (2010)). Thus, $8192=2^{13}$ Fourier modes are taken to yield a grid-spacing of approximately 12 in x. In z, in one embodiment, the dynamics in the horizontal boundary layer adjacent to the upper boundary should be resolved. This layer is thinnest at initiation when t=1. Thus, at least $1.5\sqrt{R}$ Chebyshev modes are desired (see previously referenced Boyd, J. P. (2001) p. 229). 33 polynomials are taken in z for R=100; 65 for R=200 and 500; 129 for R=1000 and 2000; 257 for R=5000 and 10000; and 513 for R=20000 and 50000. Results were also verified by convergence tests. For the permeable upper boundary, resolutions stretching from 0.2 near z=0 to 20 near z=−R were taken.

For the impermeable upper boundary, in one embodiment a time-step Δt=1 was taken for times up to 1000 and Δt=10 thereafter, ensuring the CFL condition is satisfied. For the partially permeable upper boundary, smaller values are desired because higher flow speeds are attained. In either case, it is found that the spatial resolution is the accuracy-limiting component (decreasing Δt does not further reduce the error whereas increasing the number of Fourier modes and Chebyshev modes/vertical grid points does).

Initial conditions may be described as follows. Instability is initiated by adding noise to the diffusive concentration field $$c_{diff}=1+erf(z/2\sqrt{t}) \text{ for } z<0, \qquad (10)$$

at time t=1. To identify precisely when R-effects influence the solution, they must be distinguishable from perturbation effects. Thus, a random-but-reproducible initial condition is created across different R as follows. The perturbation on a coarse mesh (Δx=20, Δz=10) is initialized from a uniform distribution (−1,1) with a repeatable seed. The thus-generated field is modulated by $\varepsilon\sqrt{0.002}z \exp(0.5-0.001z^2)$ to localize the perturbation to the interface, where the prescribed value ε is the largest possible amplitude and a localization parameter is arbitrarily chosen as 0.001. Finally, cubic splines are used to interpolate the field onto the computational, physical collocation mesh. Although it may generally be expected that the perturbation will be restricted to the upper regions, it is not expected to be constrained to the diffusive boundary layer, which is arbitrarily thin for t→0.

A number of global measures are useful for quantifying the flow. The most important is the dissolution flux (the rate at which solute dissolves from the upper boundary at z=0). Dimensionally, it is given by $$\hat{F}(\hat{t}) = \frac{\phi D}{\hat{W}} \int_0^{\hat{W}} \frac{\partial \hat{c}}{\partial \hat{z}}\bigg|_{\hat{z}=0} d\hat{x}. \qquad (11)$$

Setting $\hat{F}=Uc_{sat}F$, this rescales to $$F(t) = \frac{1}{W} \int_0^W \frac{\partial c}{\partial z}\bigg|_{z=0} dx. \qquad (12)$$

At early times, it is useful to consider the amplitude of the perturbation away from pure diffusion. This is measured using the mean square deviation $$A(t) = \frac{1}{W} \int_{-R}^0 \int_0^W (c - c_{diff})^2 dxdz. \qquad (13)$$

It is noted that the full diffusive solution is given by previously referenced Ennis-King & Patterson (2005). The error function profile of equation (10) is an excellent approximation for $c_{diff}$ provided t≤R²/36. Reported finger and plumetip locations may be defined as minima of the c=0.05 contour (examples are shown hereinafter in FIGS. 2h and 3d).

Horizontally averaged quantities are useful for characterizing the later regimes. These are defined by $$\langle a\rangle(z, t) = \frac{1}{W} \int_0^W a(x, z, t)dx \qquad (14a)$$

for some variable a. Particular focus is placed on ⟨c⟩, the horizontally averaged concentration, and ⟨c′²⟩, the mean square of the fluctuations c′=c−⟨c⟩. The latter can be thought of as the "strength" of plumes.

A final useful measure is the average width of fingers and plumes. In one embodiment this is defined as ω=π/α, where α(z,t) is the root-mean-square wavenumber of the fluctuations $$\alpha^2 = \left\langle \left(\frac{\partial c'}{\partial x}\right)^2\right\rangle \bigg/ \langle c'^2\rangle. \qquad (14b)$$

Figure 2A:
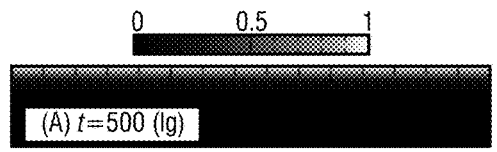
FIGS. 2a-2h are simulated concentration profile snapshots at different times t of the permeable layer as it progresses through multiple flow regimes.
Figure 2B:
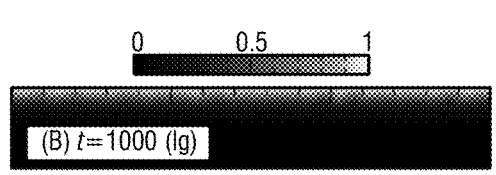
Figure 2C:
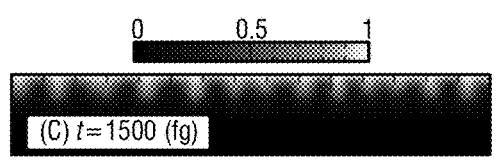
Figure 2D:
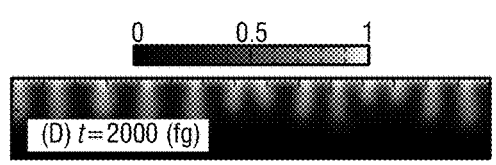
Figure 2F:
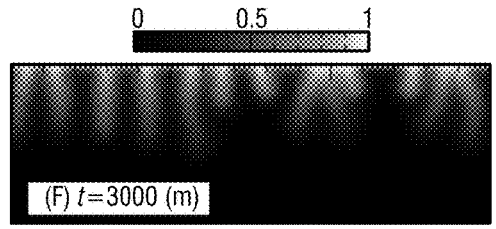
Figure 2G:
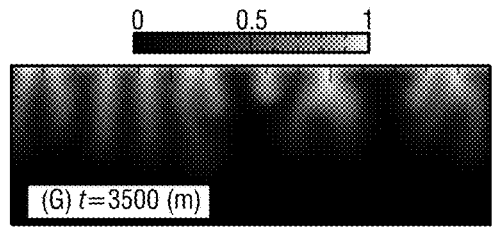
Figure 2H:
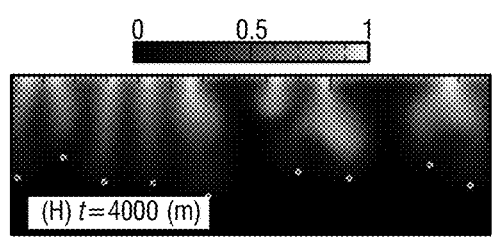
Figure 2E:
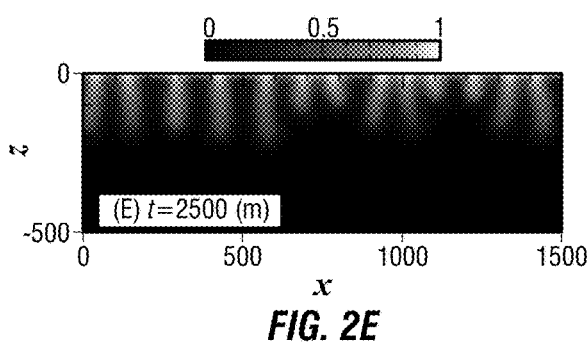

Turning now to the scenario of an impermeable upper boundary, snapshots for an exemplar simulation with R=5×10⁴ are shown in FIGS. 2a-2h, 3a-3d and 4a-4-b. FIGS. 2a-2h show concentration profiles at early times for a small region near the upper boundary with an initial perturbation amplitude ε=0.01. The dots in FIG. 2h show the location of fingertips. Note that the scale is the same in all plots and that only a small portion of the domain is shown (the bottom of the layer is far below and does not yet influence dynamics).

Figure 3A:
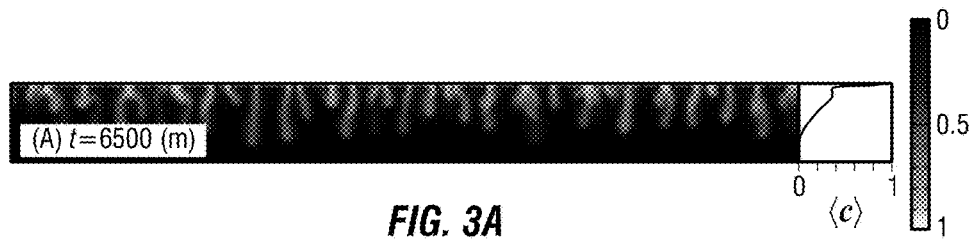
FIGS. 3a-3d are simulated concentration profiles at a progression of intermediate times t with panels on the right providing horizontally averaged concentration profiles as a function of depth.
Figure 3B:
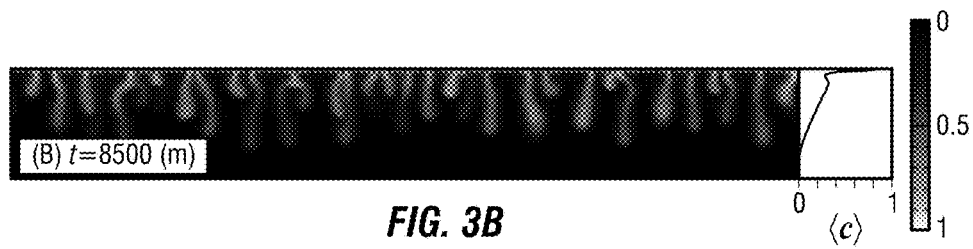
Figure 3C:
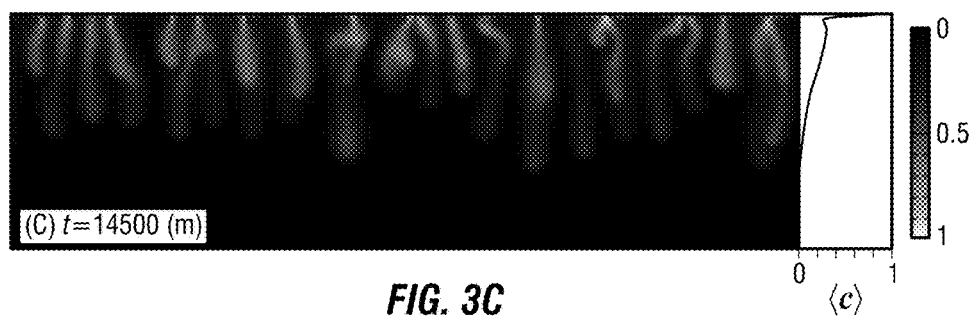
Figure 3D:
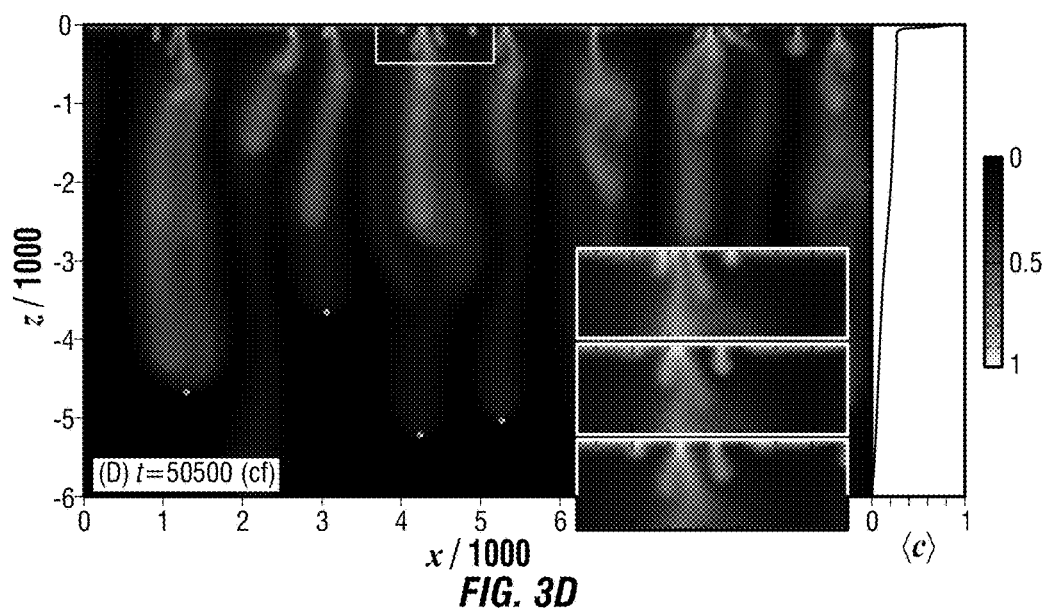

FIGS. 3a-3d show concentration profiles at intermediate times for a broader region where the same R and same initial perturbation as in FIGS. 2a-2h are applied. Panels on the right of FIGS. 3a-3d give the horizontally averaged concentration profile. In FIG. 3d, the insets on the lower right boxed region of the figure show close-ups of reinitiations at times t=44500, 46500 and 48500 (top to bottom). In FIG. 3d, the dots show the location of fingertips. Note that the spatial scale is the same in all plots and that only a portion of the domain is shown (the bottom boundary is at z/1000=−50).

Figure 4A:
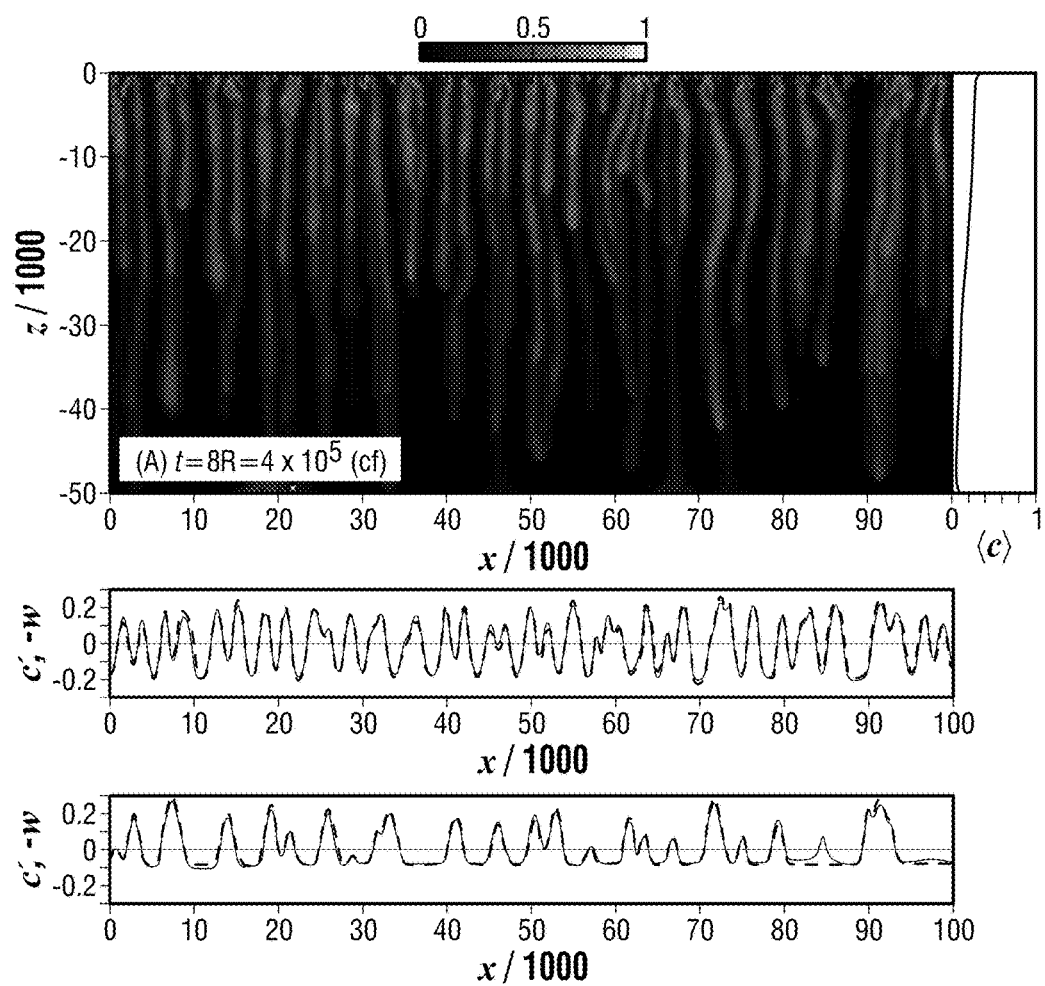
FIGS. 4a and 4b are simulated concentration profiles at late times t with panels on the right providing horizontally averaged concentration profiles as a function of depth.
Figure 4B:
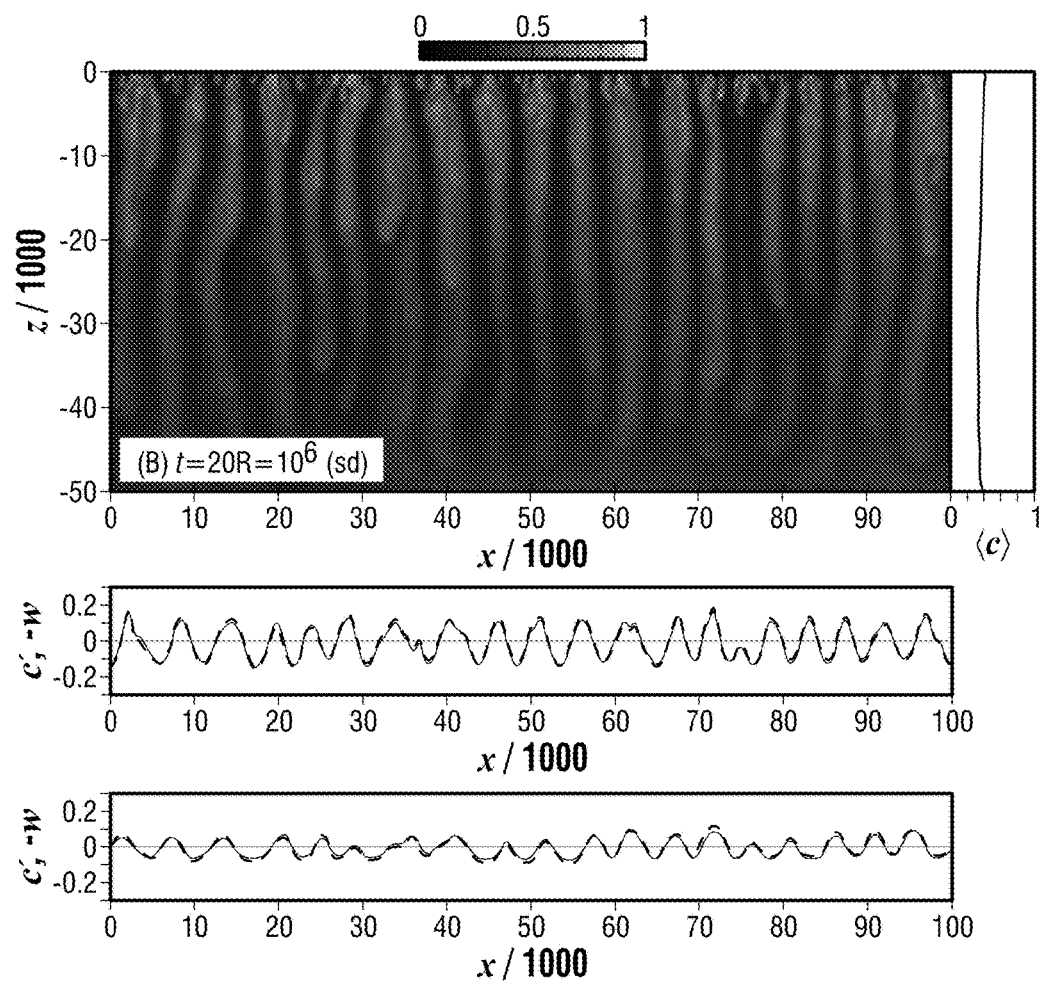

FIGS. 4a and 4b show concentration profiles at later times for the full domain for the same R. The concentration fluctuation profile and vertical velocity profile are shown below each concentration profile on slices at z=−15000 and z=−35000. Panels on the right give the horizontally averaged concentration profile. Note that the spatial scale is the same in all plots. The full domain is shown.

As explained in more detail below, FIGS. 2a-2h, 3a-3d and 4a-4-b together illustrate the regime progression previously described. Initially there is the diffusive regime (similar to FIG. 2a). In the linear-growth regime (labelled "lg"), faint perturbations appear on the diffusive boundary layer beneath z=0 (FIGS. 2a, b). During the flux-growth regime (labelled "fg"), macroscopic fingers are apparent that propagate primarily vertically (FIGS. 2c, 2d). In the merging regime (labelled "m"), fingers begin lateral migration and merge to form complex downwelling plumes (FIGS. 2e-h and 3a-c). In the constant-flux regime (labelled "cf"), small protoplumes are reinitiated on the diffusive boundary layer below z=0 and are swept into primary plumes (FIG. 3d and insets). The primary plumes propagate downwards, impact the lower boundary and spread laterally as gravity currents (FIG. 4a). These progressively thicken. Once the information about the finite extent of the layer reaches the top, the entire layer progressively saturates in the shut-down regime (labelled "sd" and represented by FIG. 4b). As will be explained in more detail hereinafter, a clear quantitative delineation exists between most of the regimes. To show this distinctly, some of the global measures previously described are plotted concurrently in FIGS. 5a-5d and 6a-6c for early and late times respectively.

Figure 5A:
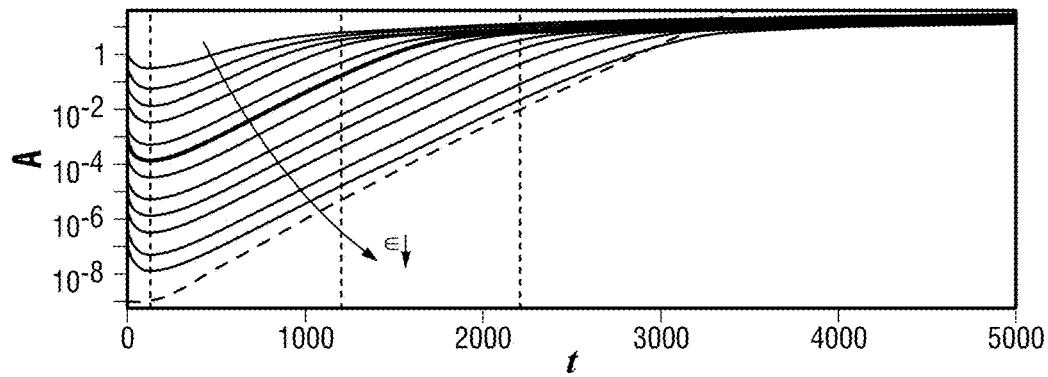
FIGS. 5a-5d are graphs of different global measures as a function of time, with FIG. 5a showing amplitude, FIG. 5b showing dissolution flux of solute into solution, FIG. 5c showing fingertip depth locations in different flow domains, and FIG. 5d showing concentration profiles.
Figure 5B:
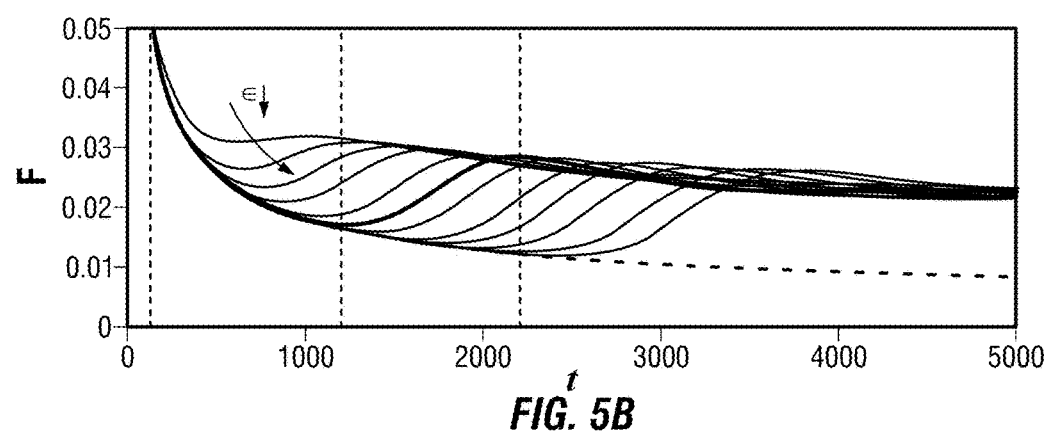

As previously indicated, initially, the flow appears purely diffusive. Although denser fluid is progressively building up over lighter fluid by diffusion of solute across the upper boundary, not enough has accumulated to overcome the smoothing effect of diffusion within the layer and sustain a growing convection cell. Perturbations away from the pure one-dimensional diffusion profile decay. This is quantified by the amplitude of the perturbations A(t) decaying as shown in FIG. 5a. The flux decays diffusively as shown in FIG. 5b according to $$F(t)=1/\sqrt{\pi t}. \quad (15)$$

Figure 7:
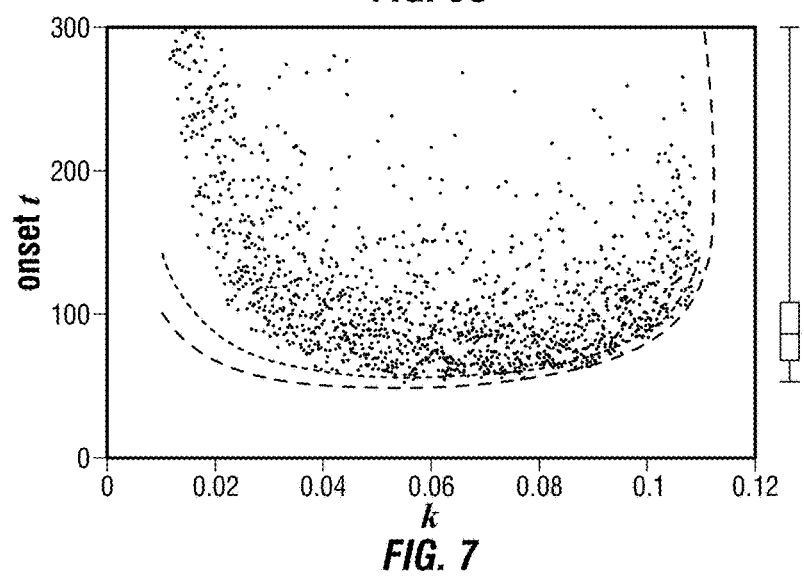
FIG. 7 is a plot of onset time for amplitude growth versus wavenumber.

As previously indicated, the second regime is linear growth ("lg"). Eventually, enough dense material accumulates beneath z=0 for convection to commence. Faint perturbations become apparent on the diffusive boundary layer (FIGS. 2a, 2b). In one aspect, the linear-onset time is defined as the time when the perturbation amplitude A(t) first starts to grow, t=116 for the exemplar simulation (FIG. 5a). However, this is a global measure of onset and growth of select modes can be masked by decay of many. FIG. 7 shows onset time for amplitude growth decomposed by Fourier wavenumber for R=1000 and initial amplitude ε=0.01, although the plot is indistinguishable for ε=0.1. The dotted curve of FIG. 7 is the quasi-steady state approximation and the dashed curve is the lower bound prediction. The box-and-whisker on the right gives the range of onset times, the quartiles and the median for intermediate wavenumbers kε(0.05,0.07).

In the linear growth regime, short waves are suppressed by lateral diffusion, while long waves require more dense fluid to grow than has accumulated: intermediate wavelengths between 80 and 140 are the first to become unstable, and do so at t≈55. This is in reasonable agreement with earliest unstable mode theory. After onset, the same intermediate wavelengths remain dominant and amplify quasi-exponentially as $$A(t) \propto \epsilon^2 \exp(\sigma t) \quad (16)$$

with σ≈0.007. This growth rate is in reasonable agreement with maximum amplification theory as shown in FIG. 5a. In FIG. 5a, the amplitude is defined by equation (13). The curve for the initial amplitude ε=0.01 is shown in bold and various additional initial amplitudes from ε=0.0001 to 0.2 are also plotted. The dashed curve is the theoretical prediction for the maximum possible amplification of infinitesimal disturbances across all wavenumbers, following the approach of Rapaka et al., "Non-modal growth of perturbations in density-driven convection in porous media", *J. Fluid Mech.* 609, 285-303 (2008). An initial amplitude of $10^{-9}$ is plotted.

The details of this regime are sensitive to the structure of the initial perturbation (although independent of the amplitude, provided ε≤0.1). Contributions of wavelengths around 80 to 140 are key: if they are negligible then onset is delayed and the emerging fingers are coarser grained. An extensive discussion of sensitivity to initial conditions is given in Elenius, M. T. & Johannsen, K., "On the time scales of nonlinear instability in miscible displacement porous media flow", *Comp. Geosc.* 16 (4), 901-911 (2012). Until the end of this regime, convective fingers are almost imperceptible and mass transport is dominated by diffusion, with the flux F still well-approximated by equation (15) as seen in FIG. 5b. FIG. 5b shows dissolution flux of solute into solution, with the curve for ε=0.01 in bold and the same selection of additional initial amplitudes as in FIG. 5a. The dashed curve is the purely diffusive behaviour given by equation (15).

As previously indicated, the third regime is flux growth ("fg"). Fingers are now apparent and begin to influence mass transport. The fingers efficiently strip dense material from the interface that accumulated diffusively during linear growth. This sharpens the diffusive boundary layer beneath z=0 (see FIGS. 2b-d) and thus increases the dissolution flux.

Flux growth is arguably the most practical measure of convective onset and is equivalent to the Schmidt-Milverton principal for thermal convection. For the exemplar simulation, it occurs at t=1200 (FIG. 5b). The flux then increases until t=2200. Both the minimum and maximum flux and times at which they are achieved depend sensitively on the initial perturbation amplitude (see FIG. 5b and previously referenced Elenius, M. T. & Johannsen, K. (2012)). They also depend on the perturbation structure. For example, shorter wavelength perturbations begin growing sooner. Therefore, such perturbations have less excess material and generate less intense convection. As a result, they do not over-thin the boundary layer significantly and a smaller flux maximum is achieved.

Figure 5C:
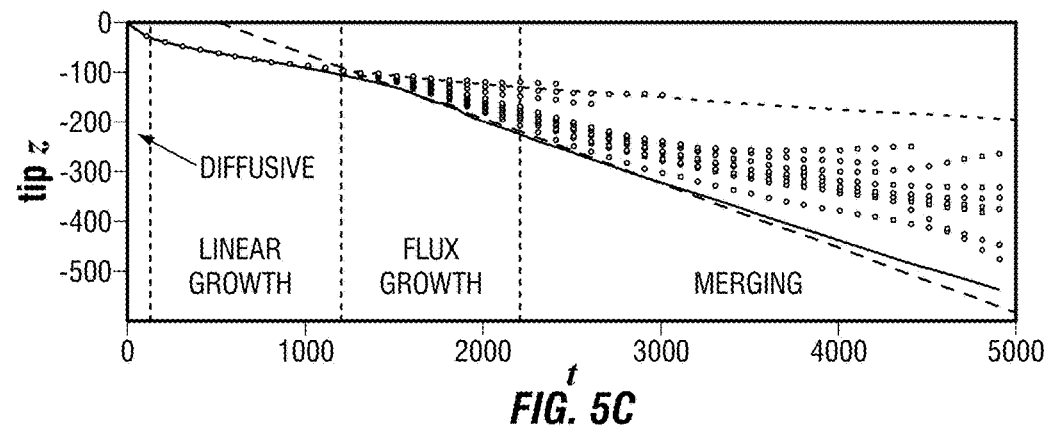
Figure 5D:
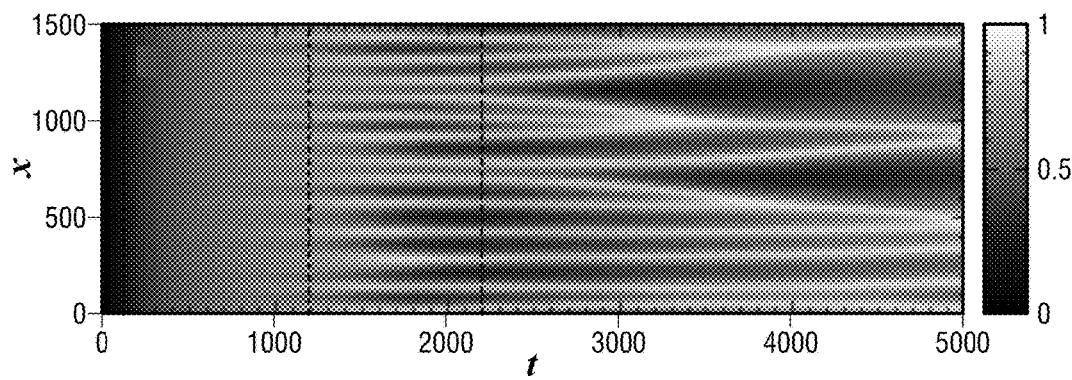

Throughout, fingers strengthen and elongate. At the beginning of the regime, vertical segregation of the finger-tips begins as seen in FIG. 5c, with the pioneers accelerating and achieving a speed of approximately 0.1 as mass transport becomes dominated by advection. FIG. 5c shows fingertip locations for ε=0.01 defined as minima of the c=0.05 contour for the tips shown in FIG. 2 (points) together with the maximum extent of all fingertips (solid curve). The short-dashed curve is the location of the c=0.05 contour for pure diffusion given by $z(c=0.05)=-2.78\sqrt{t}$ and the long-dashed line is $-0.13(t-500)$. A key characteristic is that fingers have limited lateral motion, as indicated by the essentially immobile roots shown by FIG. 5d. In FIG. 5d the concentration profile is on z=−20 for ε=0.01 to illustrate root movement. The darker regions correspond to low concentrations and the paler regions correspond to high concentrations.

As previously indicated, the fourth regime is the merging regime ("m"). Individual fingers generate a global velocity field and thus influence one another's motion. Coinciding with the time of maximum flux, this becomes a significant effect and fingers begin to interact. Where a finger lags behind, it can be forced to retreat by the upward return flow generated by its faster neighbours. Where fingers are comparable in length, pairs that are slightly closer together than their outer neighbours get pushed closer by the upwelling flow exterior to both impinging on the upper boundary and spreading laterally. The two fingers migrate towards one another and ultimately zip together. This is seen in the concentration snapshots in FIGS. 2e-h and the evolution of finger roots are shown in FIG. 5d. The zipping occurs from the root downwards. Once the fingers partially zip together, one effectively channels all the flow and solute while the other diffusively withers. Multiple generations of this coarsening process occur, although becoming rarer as the finger spacing increases and roots must traverse a greater distance before colliding and combining. Progressively the flow transitions to a system of downwelling dense plumes interwoven with broader regions of upwelling fresh fluid as suggested in FIGS. 3a-c.

As the plume spacing increases, the diffusive boundary layer below z=0 thickens slightly. This results in a decreased concentration gradient in the boundary layer and thus progressively reduces the dissolution flux.

The merging regime can be thought of as a reorganizational one. It marks the end of the strongly initial-condition dependent phase and commencement of an effectively universal one in which variations due to any differences in the initial conditions are less than chaotic fluctuations: the empirical fits that are presented for subsequent regimes were identical across multiple realizations.

As previously indicated, the fifth regime is constant flux regime ("cf"). Once the plumes are sufficiently widely spaced through mergers, the diffusive boundary layer below z=0 between them becomes sufficiently thick to be unstable. A new regime begins whose prominent feature is reinitiation of small "protoplumes" on this boundary layer. These are rapidly swept into and merge with the existing primary plumes by the upwelling flow between them (see insets of FIG. 3d). Reinitiations are generated in pulses, with the first protoplume forming close to a primary plume and subsequent protoplumes generated outside their predecessors as seen in FIG. 6c where darker regions correspond to anomalously low concentrations and paler regions correspond to anomalously high concentrations. This continues until a protoplume is generated almost at the stagnation point of the upflow between two bounding primary plumes. This protoplume persists for longer. It is usually swept into an existing primary plume eventually, resetting the cascade. Very rarely it survives to form a new primary plume.

These protoplume pulses can be interpreted as the diffusive boundary layer below z=0 becoming marginally stable: if the boundary layer is too thin, then it thickens by diffusion, while if it is too thick, a protoplume pulse strips the excess dense material. It can be noted that the timing for reaching this state is spatially heterogeneous and thus the transition time between the merging and constant-flux regimes is murky. For the exemplar simulation it occurs between 16000 and 40000.

Mergers between primary plumes continue in this regime. However, they become increasingly rare. A new mechanism for mergers, and increasingly the dominant one, is slipstreaming: lagging plumes are drawn into their furtheradvanced neighbours. This cuts off the supply of upwelling fresh fluid between them and they progressively zip together from the tip upwards.

It should also be noted that the primary plumes are long and thin. Structurally they appear complex: episodic mergers of protoplumes into them generate negatively buoyant blobs that descend and diffuse on a background downwelling. In addition, during mergers of primary plumes, there can be multiple maxima on horizontal slices within a given plume. In the upper portions of the domain, plumes exist everywhere with regions of upwelling fresher fluid having a width comparable to the plumes as seen in FIG. 4a. In the lower portions of the affected domain, the fluid is mostly fresh, with a few isolated pioneer plumes. These decelerate in time, eventually nearly stagnating or even retreating before an injection of dense fluid from a trailing plume merging into it causes it to advance again (this process results in the "bouncing" of plume tips seen in FIG. 6b (where the dashed line is $z=-w_0t$ as implied by the self-similar wedge approximation described hereinafter, the upwardly propagating plume-tips are the bottoms of shrinking pools of c<0.005 fluid, and the solid curve is the envelope over all plumes). After these pioneer plumes impact the bottom boundary, they spread locally as dense gravity currents as seen in FIG. 4a. These progressively pervade the entire layer in a manner similar to a filling-box mechanism (see, Turner, J. S., Bouyancy effects in fluids, Cambridge Univ. Press (1973), and illustrated, for example, by the shrinking pools of c<0.05 fluid beneath the interface in FIG. 6b. Once the information about the finite thickness of the layer has reached the top boundary, the constant-flux regime ends and the flow transitions to a final, shut-down regime.

Figure 6A:
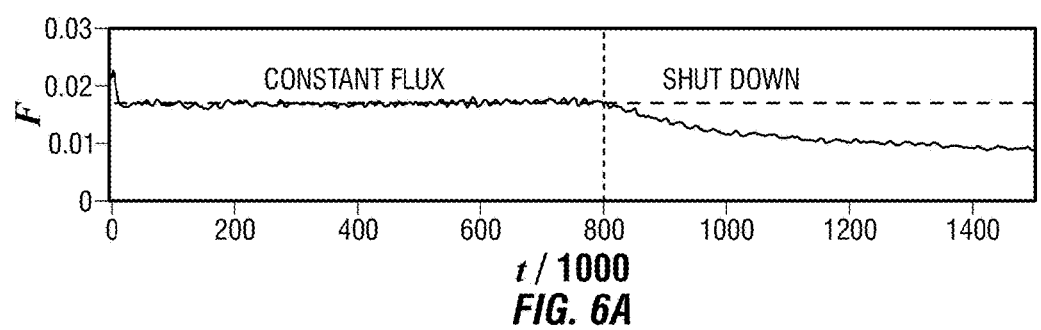
FIGS. 6a-6c are graphs with FIG. 6a showing dissolution flux of solute into solution as a function of time, FIG. 5b showing fingertip depth locations, and FIG. 6c showing a profile that shows root motion and merging.
Figure 6B:
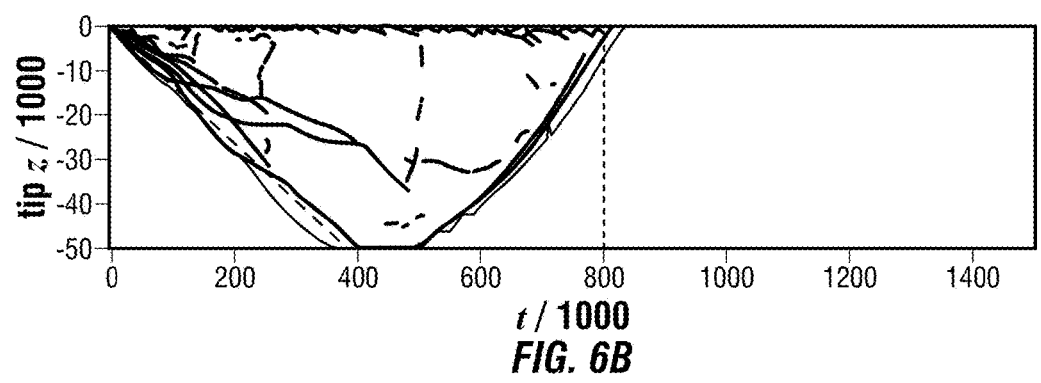
Figure 6C:
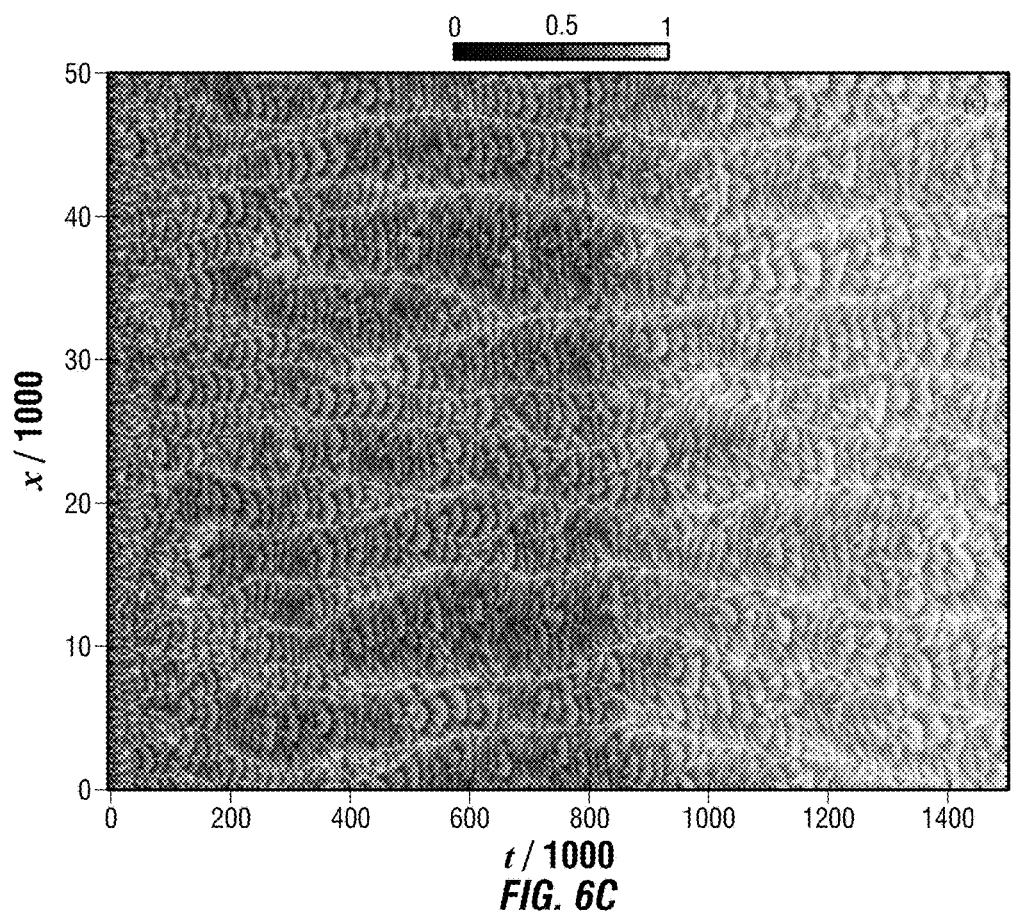

Turning to a more quantitative description of the constant flux ("cf") regime, the key characteristic is that the flux is statistically constant throughout as seen in FIG. 6a where dissolution flux of solute into solution is shown for intermediate and long time global measures for $R=5\times10^4$ and initial amplitude of $\varepsilon=0.01$. As seen in FIG. 6a, $$F=0.017 \tag{17}$$

(an empirical fit). This value is in excellent agreement with that obtained in 2D simulations described in previously referenced Pau et al., (2010). A constant flux is remarkable, given that the layer beneath is progressively saturating and suggests that the plumes adapt efficiently to remove and redistribute the incoming dense fluid. A mathematical justification is provided hereinafter.

Although the plumes appear dynamically complex, they have a surprisingly simple horizontally averaged behavior. The "bouncing" plumetips in the pioneer region propagate downwards at an approximately constant speed on average, $w_0 \approx 0.13$, (an empirical fit; see FIG. 6b). Above them, the horizontally averaged concentration profile stretches almost as the self-similar wedge (previously mentioned)

$$\langle c \rangle = c_0[1+z/(w_0t)] \text{ for } -w_0 < z/t < 0 \tag{18}$$

where $c_0 \approx 0.27$ (an empirical fit; see FIG. 8a described hereinafter). Note that there is a slight break-in-slope at $z/t \approx -0.08$ corresponding to the top of the pioneer plume region.

The average plume width increases proportionally to $\sqrt{t}$. The pre-factor has vertical structure in z/t: because merging occurs at plume tips, it decreases from approximately $\pi$ for the pioneers in z/t-0.08 to $\pi\sqrt{2}$ at the roots (see FIG. 8c).

Figure 8A:
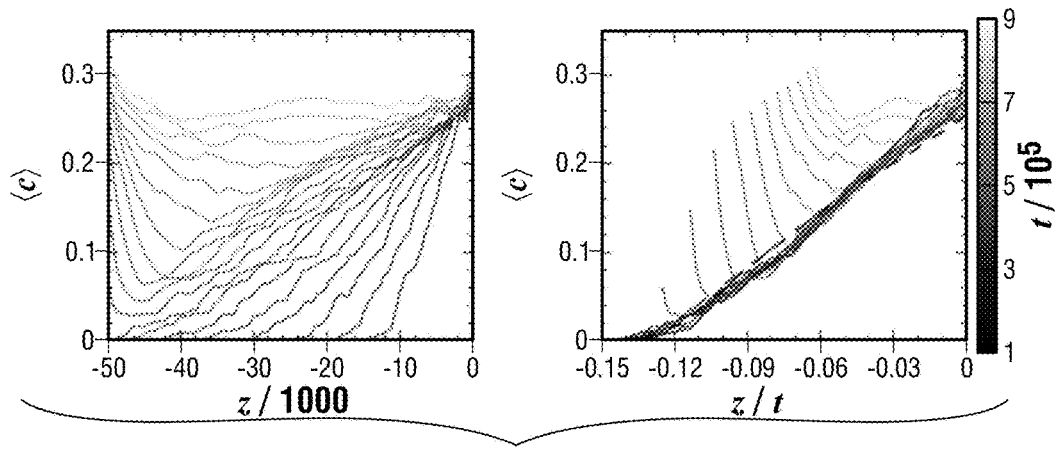
FIGS. 8a-8c are a series of right-hand and left-hand plots with the left hand and right hand plots of FIG. 8a showing concentration as a function of depth and concentration as a function of a similarity variable, the left-hand and right-hand plots of FIG. 8b showing mean-square functions as a function of depth and as a function of a similarity variable, and the left-hand and right-hand plots of FIG. 8c showing wave numbers for various times as a function of depth and as a function of a similarity variable.
Figure 8B:
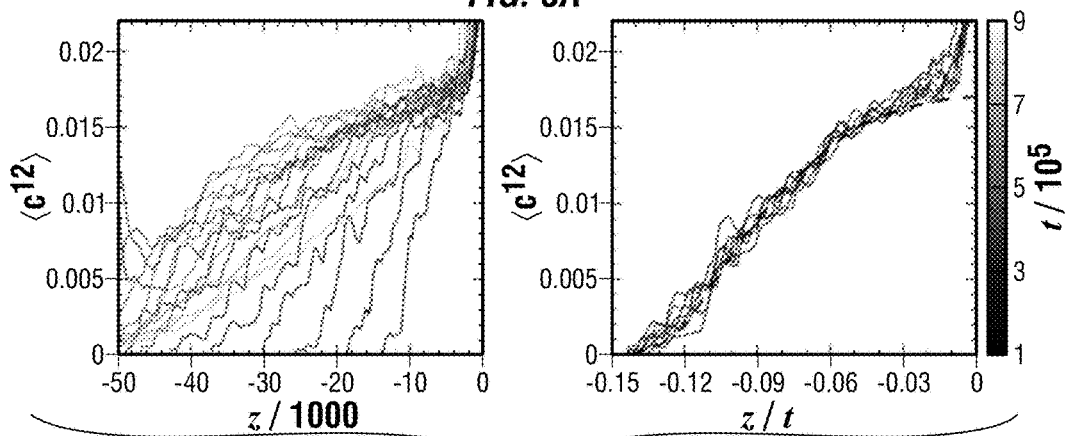
Figure 8C:
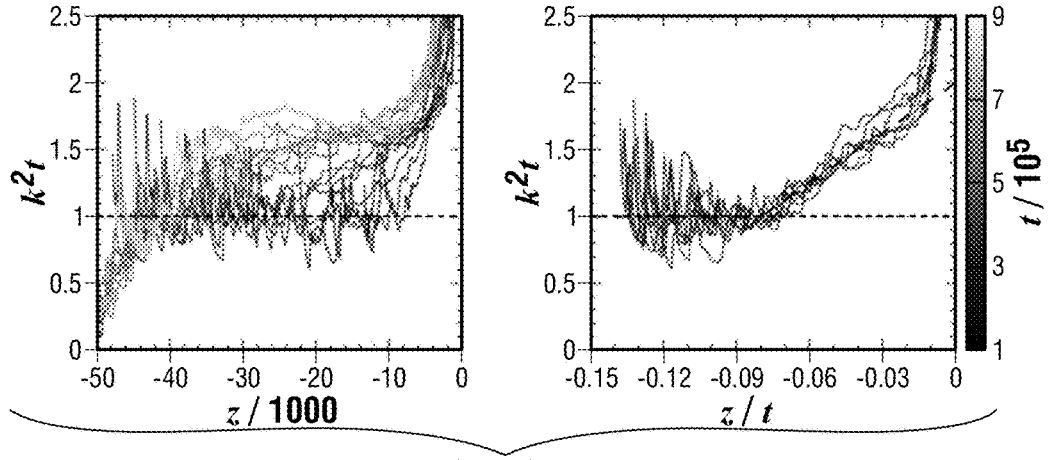

After impact, the filling-box mechanism is manifested by an upwardly propagating wedge overriding the downwardly propagating one (see equation (18)), leaving the latter unaffected (FIG. 8a). The plume width appears to continue to scale as $\sqrt{t}$ (FIG. 8c), although the post-impact subregime is too short to say so definitively. At z=-R, the gravity currents nearly homogenize the fluid and the plume widths are nearly infinite (FIG. 8c). It is noted that FIGS. 8a-8d show solutions in the constant-flux regime for $R=5\times10^4$ horizontally averaged for concentration (FIG. 8a), mean-square fluctuations (FIG. 8b), and wavenumber for times between $t=10^5$ (darker curves) and $8\times10^5$ (paler curves) (FIG. 8c). The left panels of FIGS. 8a-8c are versus the vertical coordinate z, and the right panels are versus the similarity variable z/t. The long-dashed line in the right panel of FIG. 8a represent the self-similar wedge approximation of equation (18). The shorter-dashed curves in the right panels of FIGS. 8a and 8b represent the similarity solution of the upscaled equations described hereinafter, with the approximation for $k^2 t$ that was used shown in FIG. 8c.

Justification for a similarity solution for horizontally averaged quantities may be had by considering the length scales relevant during plume evolution. In the present regime, the plumes are very long and so vertical diffusion becomes negligible. Therefore, the advection-diffusion length L used to rescale the previously governing equations is no longer directly relevant. The layer thickness H is not yet relevant. Thus there is no apparent vertical length-scale, and a similarity solution in $\hat{z}/(U\hat{t})=z/t$ may be expected (see Barenblatt, G. K., *Scaling, self-similarity and intermediate asymptotics*, Cambridge University Press (1996)). In one aspect, this argument is valid if there is also no horizontal length-scale. The horizontal wavenumber is set by a complex interplay between the induced horizontal velocity field and horizontal diffusion that controls merging and thus a length scale might be expected. Surprisingly, the observed scaling is the purely diffusive $(D\hat{t})^{1/2}$, there is no length scale and so a similarity solution is possible. It is noted that a similarity solution of this form implies a constant flux.

Figure 9:
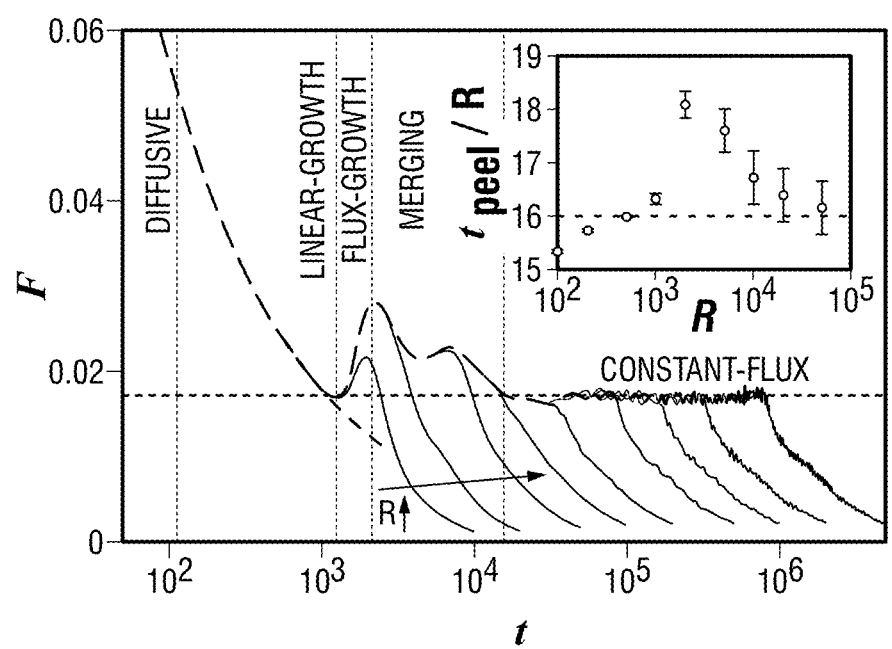
FIG. 9 is a plot of dissolution flux as a function of time for a plurality of different Rayleigh numbers, with an inset showing the peel-off time to the shut-down regime as a function of Rayleigh numbers.

Before plumes impact the base, the flow is parameter-independent: the only role of R is to determine how many of the R-independent regimes described above are encountered. After impact, the top portion of the solution is still universal, until information about the bottom boundary has propagated to the top. This universality is perhaps most apparent in the flux as shown in FIG. 9 which shows dissolution flux versus time for R=100, 200, 500, 1000, 2000, 5000, $10^4$, $2 \times 10^4$ and $5 \times 10^4$. In FIG. 9, the first five dynamical regimes (diffusion through constant-flux) are delineated. Transition to the shut-down regime for each R is indicated by the curve becoming paler. The long-dashed curve is the purely diffusive flux (equation (15)). The short-dashed line is the constant-flux regime value F=0.017 (equation (17)). The inset of FIG. 9 shows the time of peel-off $t_{peel}$ to the shut-down regime as a function of R with the approximation $t_{peel}$=16R.

Figure 10:
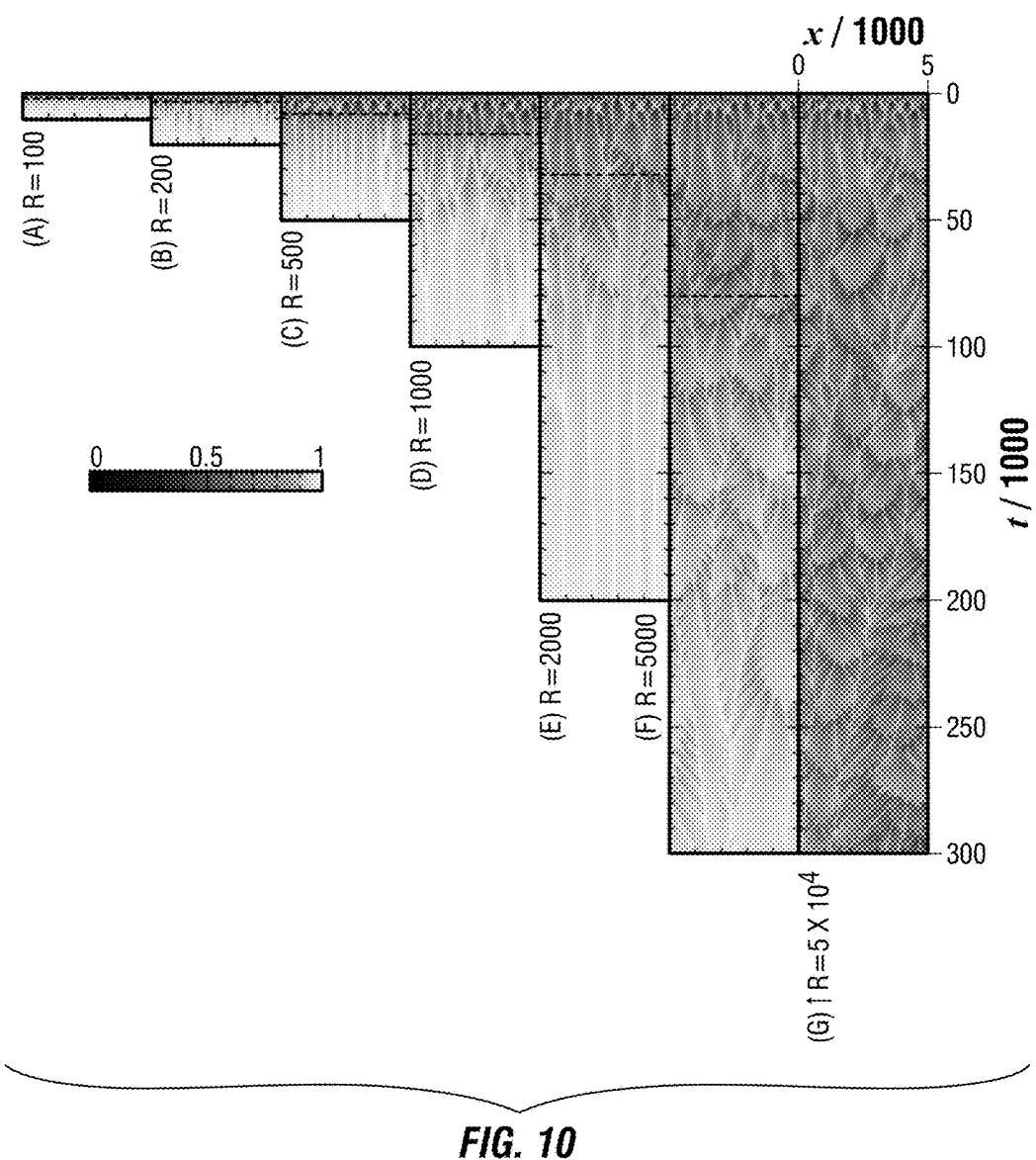
FIG. 10 is a graph showing evolution in time of the concentration profile at a depth for various Rayleigh numbers.

As seen in FIG. 9, for a repeatable noisy initial condition, the curves for different R all overlap until one-by-one they peel off and commence decay as the layer saturates and convection shuts down. At longer times, the overlap is statistical rather than exact because tiny feedback from the large-scale flow results in chaotic variations. Similarly, the evolution of the concentration profile on a slice just beneath the upper boundary is identical as seen in FIG. 10 which shows evolution in time of the concentration profile on z=−20 for various Rayleigh numbers. The dashed lines indicate the time of transition to the shut-down regime.

In one aspect, after plumes impact the bottom boundary, the layer thickness H becomes a relevant length scale. Similar to the argument for the existence of a similarity solution above, results might now be expected to be universal if the governing equations (1)-(6) are rescaled by H rather than L. This is equivalent to considering independent variables x/R, z/R, and t/R. This indeed yields universal results for the time that plumes impact the base, t≈8R, and the end of the constant-flux regime, t≈16R (FIG. 9 inset). It also provides an excellent collapse for the flux in the shut-down regime (FIG. 11d) and a good collapse of the horizontally averaged concentration (not shown).

The dynamical nature of the sixth and final regime, the shut-down regime ("sd") remains that of the regime before transition (illustrated in the root behaviour shown in FIG. 10). For R=100, there are enduring fingers having no lateral motion. For R=200, fingers are merging, while for R=500 and 1000, there are mergers and spatially localized initiations of protoplumes. Both mergers and reinitiations become less frequent as the layer saturates.

For R>2000, when the regime before transition was constant-flux, reinitiations of protoplumes on the diffusive boundary layer below z=0 remain the prominent dynamical feature. However, their frequency is reduced (see FIGS. 6c and 10c and 10d) as the driving density difference reduces. Mergers and coarsening continue, although the plume width grows more gradually than the $\sqrt{t}$ behavior earlier described (further details are given by Hewitt, D. R. et al., "Convective Shutdown in a Porous medium at high Rayleigh number", *J. Fluid Mech.* (2013)). Structurally, the downwelling primary plumes transition to a vertical columnar exchange flow (see FIG. 4b) reminiscent of the equivalent thermal problem (see, Hewitt, D. R. et al., "Ultimate regime of high Rayleigh number convection in a porous medium." *Phys. Rev. Lett.* 108 (22) 224503 (2012)), although it is not simply a quasi-statically adjusting form as the layer saturates. (The sinusoidal component of the profile clearly depends on z/R.)

Figure 11A:
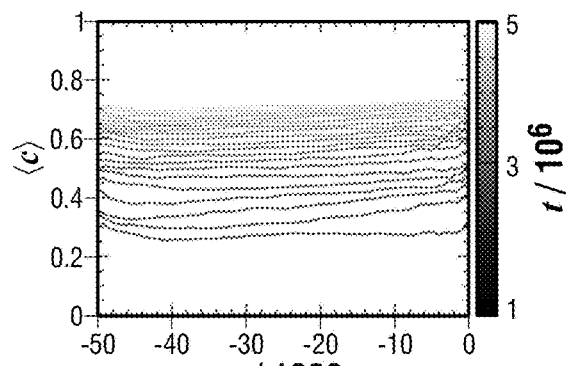
FIGS. 11a-11d are graphs showing respective concentration as a function of depth, mean-square fluctuations as a function of depth, wavenumber for multiple times as a function of depth, and dissolution flux for various Rayleigh numbers as a function of time rescaled by Rayleigh number.
Figure 11B:
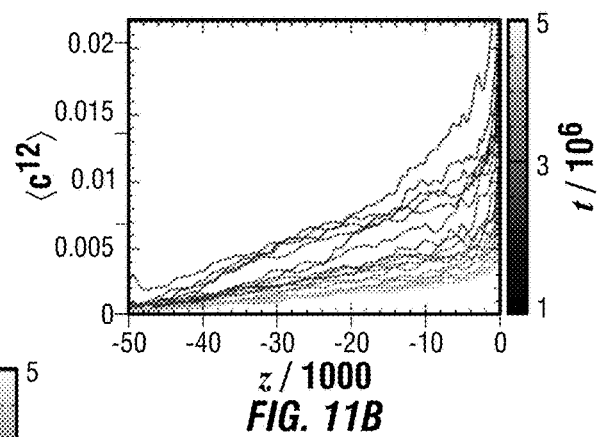

During this shut-down regime, the horizontally averaged concentration profile consists of a progressively expanding upper diffusive boundary layer with an almost vertically well-mixed bulk beneath (see FIG. 11a). Exploiting this observation, the gradually decaying flux can be well described by a simple box-model (see, Slim, A., et al., "Dissolution-driven convection in a Hele-Shaw cell", *Phys. Fluids* 25, 024101 (2013). As discussed hereinafter, this may be put it in the context of the upscaled equations so as to modify the initial condition to coincide with the end of the constant-flux regime.

Figure 11C:
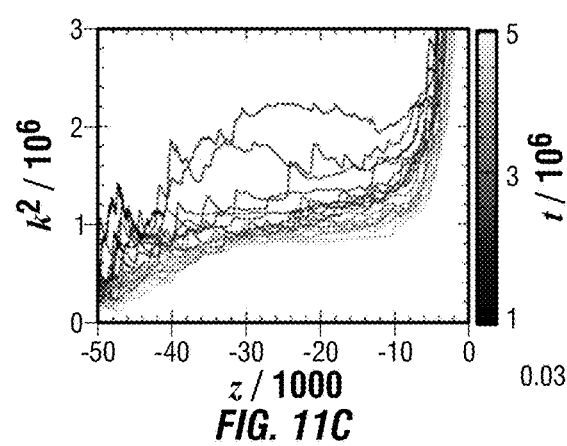
Figure 11D:
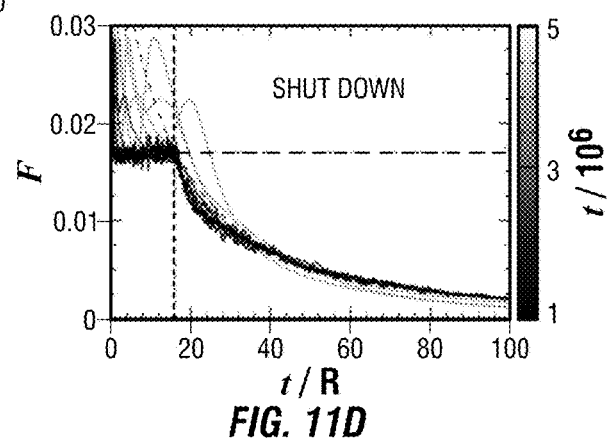

FIGS. 11a-11d show solutions in the shut-down regime for R=$5 \times 10^4$ horizontally averaged for concentration (FIG. 11a), mean-square fluctuations (FIG. 11b), and wavenumber for times between t=$8 \times 10^5$ (darker curves) and $5 \times 10^6$ (paler curves) (FIG. 11c). FIG. 11d shows the dissolution flux for the same Rayleigh numbers of FIG. 9 against time rescaled by R. In FIG. 11d, the short-dashed line is the constant-flux regime value of equation (17). The long-dashed curve is the phenomenological prediction for the shut-down regime according to an equation discussed hereinafter. The curves for R=100 to R=1000 are pale to indicate that these do not reach the constant-flux regime and thus the latter prediction may not apply, although it is seen to be a reasonable approximation.

According to one aspect, it is valuable to derive upscaled equations that capture the fine-scale physics on a scale achievable in reservoir simulations. As described previously, the horizontally averaged concentration profile has simple, elegant forms in the constant-flux and shut-down regimes. Thus, according to one aspect, governing equations for horizontally averaged quantities are sought.

According to one aspect, the dynamics in the bulk below the diffusive boundary layer beneath z=0 are first considered. The first two flow equations (8a), (8b) are reduced using $\partial_x[\nabla \times$(eq. 8a)$]-\partial_z$(eq. 8b) to obtain $$\frac{\partial^2 w}{\partial x^2} + \frac{\partial^2 w}{\partial z^2} = -\frac{\partial^2 c}{\partial x^2}. \tag{19a}$$

The plumes are slender, so vertical derivatives over horizontal are neglected. Integrating in x results in $$w = -c' \quad (19b)$$

where periodicity is invoked and $\langle w \rangle = 0$ is assumed due to incompressibility. Physically, this states that the vertical velocity is directly set by the local concentration anomaly. The approximation is good (see FIGS. 4a, 4b) except where there is an upwelling of fresh fluid between pioneer plumes.

Horizontally averaging the advection-diffusion equation for solute transport according to the third flow equation of equation, ignoring vertical diffusion over horizontal, and using equation (19b) results in $$\frac{\partial \langle c \rangle}{\partial t} = \frac{\partial \langle c'^2 \rangle}{\partial z}. \quad (20)$$

It should be appreciated that applying equation (19) everywhere is adequate because $c=0$ where the approximation is poor.

A useful observation is that $$\langle c'^2 \rangle = f(z,t), \quad (21)$$

where f is the local vertical advective flux of solute (the only form of vertical solute transport under the slenderness approximation). Thus physically, equation (20) is a simple conservation law for solute.

In one aspect, a closure expression for $\langle c'^2 \rangle$. Thus, in one embodiment, the next moment is obtained. In particular, multiplying equation (8c) by c and proceeding as above, it can be derived that $$\frac{\partial \langle c'^2 \rangle}{\partial t} - 2\langle c'^2 \rangle \frac{\partial \langle c \rangle}{\partial z} - \frac{\partial \langle c'^3 \rangle}{\partial z} = -2 \left\langle \left( \frac{\partial \langle c' \rangle}{\partial x} \right)^2 \right\rangle = -2\alpha^2 \langle c'^2 \rangle, \quad (22)$$

where $\alpha$ is the horizontal wavenumber. Equation (22) introduces two new moments, $\langle c'^3 \rangle$ and $\langle (\partial c'/\partial x)^2 \rangle$. The third moment $\langle c'^3 \rangle$ is generally small because up- and down-wellings are nearly symmetric. The pioneer plumes can be reasonably approximated by portions of sinusoids. Setting $$c = \begin{cases} \frac{1}{2} A(1 + \cos\alpha x) & \text{for } 2\pi M j/\alpha - \pi/\alpha \leq x \leq 2\pi M j/\alpha + \pi/\alpha \\ 0 & \text{otherwise,} \end{cases} \quad (23a)$$

and calculating the first three moments, it can be determined that $\langle c^3 \rangle = (10/9) \langle c^2 \rangle^2 / \langle c \rangle$. This approximation is permissible for $\langle c'^2 \rangle \geq \langle c \rangle^2/2$. Thus, in one embodiment the third moment is ignored except when pioneer plumes first enter a region, and by approximating individual plumes as portions of sinusoids yields $$\langle c'^3 \rangle = \frac{1}{9} \langle c \rangle^3 - \frac{7}{9} \langle c \rangle \langle c'^2 \rangle + \frac{10}{9} \langle c'^2 \rangle^2 / \langle c \rangle \quad (23b)$$
$$\text{for } \langle c'^2 \rangle \geq \langle c \rangle^2/2$$

with good accuracy. The $\langle (\partial c'/\partial x)^2 \rangle$ term can be interpreted as the local scalar dissipation rate of turbulence (see, Hanjalic, K. "One-point closure models for buoyancy-driven turbulent flows", *Annu. Rev. Fluid Mech.* 34 (1), 321-347 (2002)). However, in one aspect, it may be more meaningful to interpret it as indicative of the plume width $\omega$ through $\omega = \pi/\alpha$. In one aspect, it should be noted that ignoring the $\langle c'^3 \rangle$ term entirely can result in a need for shocks. For example, in pioneer plume territory, solutions are found to curl over unphysically, which would suggest replacing the entire region with a shock (the equations are hyperbolic, provided $\alpha^2$ does not introduce a first order term).

An interpretation of equation (22) is possible through the representation of equation (21): the local vertical advective flux f is eroded through conversion to a horizontal diffusive flux (the right-hand side of the equation) and augmented by the introduction of denser material from above and lighter from below intensifying the plumes (the term proportional to $\partial \langle c \rangle / \partial z$).

In one embodiment, before turning to solutions of these governing equations, boundary conditions are required. The intention is to shrink the diffusive boundary layer beneath $z=0$ to zero thickness and impose an effective boundary condition that describes the conversion of vertical diffusive transport into the system into vertical advective transport into the bulk.

At the top of the bulk, $z=0^-$, the following is expressed:

$$F = f = \langle c'^2 \rangle \text{ at } z = 0^-. \quad (24a)$$

A phenomenological description of the dissolution flux F, linking it to the horizontally averaged concentration $\langle c \rangle |_{z=0^-}$ just below the boundary layer can be obtained from Fick's law, so that $$F(t) = \frac{1 - \langle c \rangle |_{z=0^-}}{\delta}, \quad (24b)$$

where $\delta$ is an effective boundary-layer thickness. The boundary layer may be assumed to be marginally stable $$[1 - \langle c \rangle |_{z=0^-}] \delta = R_c \quad (24c)$$

where the left-hand side is an effective Rayleigh number for the boundary layer and $R_c$ is a critical Rayleigh number, assumed constant. Combining these results in $$F = \langle c'^2 \rangle = \frac{(1 - \langle c \rangle)^2}{R_c} \text{ at } z = 0^- \quad (24d)$$

In one embodiment, equations (20), (22), (23b) and (24d) are used in a reservoir simulator such as ECLIPSE in order to determine how and where the solute is transported in a porous medium over time. In the case of carbon-dioxide, this includes a determination of the amount of $CO_2$ that is in dissolved form and the amount that is in its own phase. In one aspect, equations (20) and (22) replace equation (8c) in ECLIPSE. In one aspect, the reservoir simulator utilizes upscaled equations describing advective transport for the solute that is suitable for computer computation with respect to a formation breadth on the order of a kilometer or more. In one embodiment, the upscaling is accomplished on the order of tens to hundreds of meters in the horizontal direction. This permits an understanding of motion on grid scales of a meter or more.

In one embodiment a reasonable approximation for $R_c$ in equation (24d) is $R_c \approx 31.5$ based on the values of F and $c_0$ in the constant-flux regime and using FIG. 12 where the local vertical advective flux $\langle c'^2 \rangle$ is plotted versus the horizontally averaged concentration $\langle c \rangle$ in the constant-flux and shut-down regimes, where early times are darker and later times are paler. The horizontal and vertical dotted lines in FIG. 12 are $\langle c'^2 \rangle = F = 0.017$ and $\langle c \rangle = c_0 = 0.27$. The dashed bold curve is the heuristic functional behavior for the effective upper boundary condition of equation (24d).

In one embodiment, at the bottom of the layer, the advective flux can be assumed to be zero and so $$f = \langle c'^2 \rangle = 0 \text{ at } z = -R. \tag{25}$$

This is a reasonable approximation (see FIG. 8b right panel and FIG. 11b) except immediately after plumes reach the bottom. At this time, the spreading gravity currents violate the slenderness approximation and equation (19b) fails.

As previously described, according to one embodiment, a similarity solution may be utilized in conjunction with the constant flux regime. In particular, it is possible to set $\zeta = z/t$ and $\kappa^2 = \alpha^2 t$ in equations (20)-(25), with $\kappa^2(\zeta)$ taking the functional form shown in the right panel of FIG. 8c. Solving the resulting ordinary differential equation in $\zeta$ numerically using a shooting method, solutions are obtained as shown in the right panels of FIGS. 8a and 8b in reasonable agreement with the simulation data.

According to another aspect, the box model may be rederived for the shut-down regime. For the shut-down regime, it can be assumed that $\langle c \rangle$ is uniform in z at leading order. Then integrating equation (22) from z=−R to z=0⁻, the following is obtained:

$$R \frac{d\langle c \rangle}{dt} = \frac{(1 - \langle c \rangle)^2}{R_c} \tag{26a}$$

with the solution $$\langle c \rangle = \frac{(1 - c_0)t' + c_0 R_c}{(1 - c_0)t' + R_c} \tag{26b}$$

where $t' = t/R - 16$, and the initial condition $\langle c \rangle = c_0$ has been taken at $t' = 0$. This implies $$F = \frac{R_c(1 - c_0)^2}{[(1 - c_0)t' + R_c]^2} \tag{26c}$$

This solution is a good fit across all R (FIG. 11d), albeit with a noticeable overestimate soon after transition to the shut-down regime when the bulk is not fully well-mixed.

In one embodiment it is assumed that the upper boundary is partially permeable. In the partially permeable upper boundary scenario, fluid from the convecting layer can be exchanged with saturated fluid in an overlying layer. In one aspect it is instructive to examine upper layer relative permeabilities K=0.2 and 0.6 because besides being of practical interest in $CO_2$ storage, this case also provides some insight into the mechanism controlling plume width.

Figure 14A:
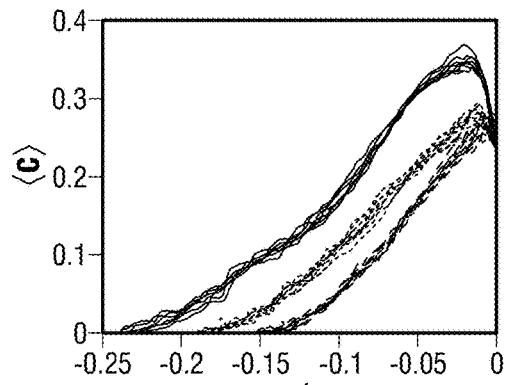
FIGS. 14a-14d are respectively plots of the horizontally averaged concentration as a function of a similarity variable, the local vertical advective flux as a function of the similarity variable, a wavenumber function as a function of the similarity variable, and the dissolution flux as a function of time for different permeabilities assumed for the upper boundary.
Figure 14B:
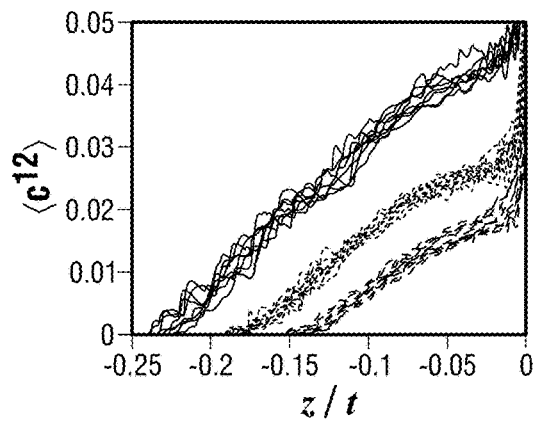
Figure 14C:
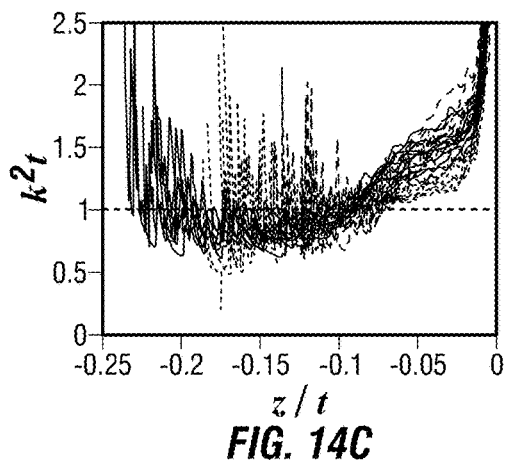
Figure 14D:
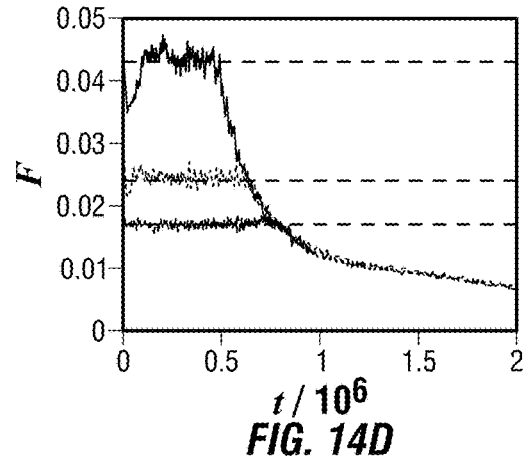

The qualitative behavior is very similar to the impermeable case, with almost identical regimes and characteristics. The key difference is that convection is more intense, with higher fluxes and greater concentrations in fingers and plumes. Transitions also occur sooner. Plots of the temporal evolution on a slice just beneath the upper boundary are shown in FIGS. 13a-13c where evolution of the concentration profile on z=−20 is shown in time for $R = 5 \times 10^4$ and where (a) K=0 (impermeable), (b) K=0.2 and (c) K=0.6. FIGS. 14a-14d plot the dissolution flux, horizontally averaged profiles and wavenumbers focusing on times starting with the transition to the constant-flux regime. More particularly, FIGS. 14a-d shows the partially permeable upper boundary scenario for $R=5\times10^4$ and K=0 (darkest curves), K=0.2 (dark curves) and K=0.6 (pale curves). FIG. 14a shows the horizontally averaged concentration for the three permeabilities. FIG. 14b shows fluctuations. FIG. 14c shows wavenumbers for the pre-impact constant-flux regime in the similarity variable z/t, while FIG. 14d shows the dissolution flux. In FIG. 14d, the dashed lines at F=0.017, 0.025 and 0.044 approximate the fluxes in the constant-flux regimes.

Once the primary plumes are sufficiently widely spaced in the merging regime, reinitiation of protoplumes again begins. Now significant differences appear from the impermeable case. Specifically, the nature of the boundary layer below z=0 and the reinitiations differ substantially, and increasingly so as K increases (see FIG. 13). First, the downwelling primary plumes are much broader and higher concentration, and appreciably fresher fluid exists close to the boundary. This sharpens the concentration gradient and ultimately leads to higher fluxes. Second, the protoplume pulses change markedly. For K=0.2, protoplumes are reinitiated near the primary plume for considerable time before the pulse expands towards the stagnation point and resets the cascade (FIG. 13b). For K=0.6, protoplumes are only reinitiated near the primary plume and do not expand to form a pulse (See FIG. 13c). Thus it is no longer entirely clear that the paradigm of marginal stability of the diffusive boundary layer beneath z=0 applies. Beneath the boundary layer, the bulk flow is qualitatively identical. Plumes are longer and higher concentration, but evolve similarly.

Unlike the impermeable case, the flux is not immediately constant once reinitiations occur everywhere. Instead, there is a prelude of a second flux-growth regime whose origin is unclear.

In the constant-flux regime, fluxes are significantly higher. As determined empirically, F=0.025 for K=0.2, and F=0.044 for K=0.6. However, remarkable agreement is seen between the wavenumbers in the bulk (see FIG. 14c). This suggests that the plume width is primarily bulk controlled rather than boundary-layer controlled, consistent with merging occurring via slip-streaming and commencing near the tips.

As in the impermeable case, once information about the finite thickness of the layer has reached the upper boundary, the flow transitions to a shut-down regime that retains the dynamics of the previous regime. If this last regime was constant flux, then the horizontally averaged concentration profile is again a diffusive boundary layer with an essentially uniform concentration beneath, although concentrations are higher than in the impermeable case. Surprisingly, the flux overlaps to within stochastic noise (FIG. 14d). In one aspect, this result is particularly intriguing because the flux depends on both the boundary-layer and bulk structures.

According to one embodiment, upscaled governing equations for solute transport including equations (20), (22), (23b) and (24d) and appropriate parameterization are used in a reservoir simulator in order to simulate the dissolution flux of carbon dioxide in a saline formation across an entire reservoir for the purpose of modeling $CO_2$ storage. With present reservoir simulators, it is prohibitively expensive to use the fine grid-scales required to capture the dissolution flux accurately across an entire reservoir. By modifying the reservoir simulators with the upscaling governing equations and appropriate parameterization as previously described, accurate estimations may be obtained. According to one embodiment, an appropriate lower bound parameterization is $$\begin{cases} 1/\sqrt{\pi t} & 0 < t < 1100, \\ 0.017 & 1100 < t < 16R, \\ \dfrac{16}{[0.73(t/R - 16) + 31]^2} & t > 16R, \end{cases} \quad (27)$$

rescaled according to equation (7) for a homogeneous, isotropic reservoir.

In one embodiment, the evolution of aqueous $CO_2$ beneath the separate-phase region may be modeled in a commercial simulator such as ECLIPSE. This would then allow automatic capture of the evolving flux. The upscaled equations (20), (21) (22), (23b) and (24d) are useful in such a fluid model. It will be appreciated that the reservoir simulator employs a reservoir model that represents the physical space or boundaries of the reservoir by an array of discrete cells, delineated by a grid which may be regular or irregular. The array of cells is often three dimensional, although 1D and 2D models are also used. Values for attributes such as porosity, permeability and water saturation are associated with each cell. The reservoir model typically includes the following information for the reservoir of interest: Top reservoir surface, which can be a constant value or a complex surface interpolated from well markers and/or geophysics; Base reservoir surface, which can be derived as an offset (constant or variable) from the top reservoir surface or a complex surface interpolated from well markers and/or geophysics; Reservoir boundaries, which can be derived from bounding faults, pinchouts, designated extent, etc.; Rock and fluid properties such as porosity, permeability, relative permeabilies, water saturation, and net-to-gross ratio (which can be derived from inversion of seismic data and well logs and/or historical data). The reservoir model also includes data that models the transport of fluid as solute in the reservoir of interest and may include a set of variables (e.g., injection rate) and their associated values that can be selected by the user, fixed by system design or defined in some other manner.

In an exemplary embodiment, data analysis operations and/or the reservoir simulator are embodied as software modules executing on a computer workstation that includes a processor (e.g., central processing unit (CPU)) and a memory (e.g., hard disk drive(s)). The software modules can be persistently stored in the hard disk drive(s) of the workstation and loaded into memory for execution by the CPU(s) of the workstation. In an alternate embodiment, the data analysis operations can be embodied as software modules executing in a distributed computing environment (such as a computing cluster or grid) or in a cloud computing environment. In one embodiment, the reservoir simulator can be embodied by the ECLIPSE reservoir simulator with the upscaled equations (20), (21) (22), (23b) and (24d) as previously indicated.

According to one aspect, verification of the model of equations (20)-(25) is possible by comparison with the steady state thermal problem. In steady state, equation (20) implies $\langle c'^2 \rangle$ is constant and equation (22) implies $$\frac{\partial \langle c \rangle}{\partial z} = \alpha^2.$$

Taking $\alpha^2$ constant and replacing equation (25) with $F = \langle c'^2 \rangle = \langle c \rangle^2 / R_c$ on $z = -R$ yields $F = (1 - \alpha^2 R)^2 / 4R_c$. This provides a flux approximation within 10% of the simulated data of the previously referenced Hewitt et al. (2012) reference using their observed value for the wavenumber $\alpha(R) = 0.48/R^{-3/5}$.

There have been described and illustrated herein several embodiments of methods of assessing a geological formation utilizing a reservoir simulator that includes upscaled equations describing advective transport for solute. While particular embodiments and aspects have been described, it is not intended that the disclosure be limited thereto, and it is intended that the claims be as broad in scope as the art will allow and that the specification be read likewise. Thus, while a particular reservoir simulator was described, it will be appreciated that other reservoir simulators could be utilized. Similarly, while upscaling of a particular amount or range was described, it will be appreciated that other amounts could be utilized. Also, while particular values for constants were described for purposes of making various determinations, it will be appreciated that other values for those constants could be utilized. It will therefore be appreciated by those skilled in the art that yet other modifications could be made. Accordingly, all such modifications are intended to be included within the scope of this disclosure as defined in the following claims. In the claims, means-plus-function clauses, if any, are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of fluid sequestration that includes analyzing fluid flow in a porous permeable geological formation reservoir, comprising:

defining first data representing a reservoir model that characterizes physical properties of said formation reservoir derived from physical measurements of said formation reservoir, wherein the physical properties of said formation reservoir include physical boundaries of said formation reservoir;

defining second data that characterize a process of injection of fluid into said formation reservoir over a period of time;

configuring a reservoir simulator to generate third data that characterize transport of the fluid as solute within the physical boundaries of said formation reservoir as defined by said first data in accordance with said second data, wherein said reservoir simulator utilizes at least one upscaled equation describing advective transport for the solute;

wherein said at least one upscaled equation is an advection-diffusion equation that represents a conservation law of the solute and utilizes horizontal averaging of solute transport, and said at least one upscaled equation is of the form $$\frac{\partial \langle c \rangle}{\partial t} = \frac{\partial \langle c'^2 \rangle}{\partial z},$$

where t is time, z is a depth location relative to a border defined by said first data, c is a solute concentration, and c'² is a second moment of said solute concentration; and injecting the fluid into the formation reservoir, based upon, at least in part, one or more results following the configuring of the reservoir simulator.

2. A method according to claim 1, further comprising: displaying said third data.

3. A method according to claim 2, wherein: said displaying comprises displaying an indication of said solute concentration as a function of location in said formation reservoir at at least one time.

4. A method according to claim 1, further comprising: optimizing at least one parameter of said second data.

5. A method according to claim 4, wherein: said at least one parameter of said second data comprises at least one of injection rate, location of injection, and time length of injection.

6. A method according to claim 1, wherein: the fluid comprises carbon-dioxide and said formation reservoir contains brine.

7. A method according to claim 1, wherein: said at least one upscale equation further includes $$\frac{\partial \langle c'^2 \rangle}{\partial t} - 2\langle c'^2 \rangle \frac{\partial \langle c \rangle}{\partial z} - \frac{\langle c'^3 \rangle}{\partial z} = -2\left\langle \left(\frac{\partial c'}{\partial x}\right)^2 \right\rangle = -2\alpha^2 \langle c'^2 \rangle,$$

where $\alpha$ is a horizontal wavenumber, $c'^3$ is a third moment of said solute concentration and x is a horizontal location defined by said first data.

8. A method according to claim 7, wherein: said third moment is determined according to $$\langle c'^3 \rangle = \frac{1}{9}\langle c \rangle^3 - \frac{7}{9}\langle c \rangle\langle c'^2 \rangle + \frac{10}{9}\langle c'^2 \rangle^2 / \langle c \rangle$$

for $\langle c'^2 \rangle \geq \langle c \rangle^2 / 2$.

9. A method according to claim 1, wherein: said reservoir simulator utilizes a boundary condition $$F = \langle c'^2 \rangle = \frac{(1 - \langle c \rangle)^2}{R_c}$$

at $z=0^-$, where F is the dissolution flux and $R_c$ is a critical Rayleigh number.

10. A method according to claim 9, wherein:

$R_c \approx 31.5$.

11. A method according to claim 1, wherein: said first data describes an impermeable saturated upper layer for said formation reservoir.

12. A method according to claim 1, wherein: said first data describes a partially permeable saturated upper layer for said formation reservoir.

13. A method according to claim 1, wherein: said formation reservoir has at least one dimension greater than one kilometer.

14. A method according to claim 1, wherein: the physical measurements of said formation reservoir are selected from the group consisting of well markers, geophysic measurements, seismic measurements, well logs, and combinations thereof.

15. A method according to claim 1, wherein: the physical properties of said formation reservoir further include rock and fluid properties of said formation reservoir.

* * * * *